US012763888B2

(12) United States Patent
Wang et al.

(10) Patent No.: US 12,763,888 B2
(45) Date of Patent: Oct. 13, 2026

(54) BANDWIDTH PART (BWP) OPERATION AND COLLISION HANDLING FOR FULL DUPLEX COMMUNICATIONS

(71) Applicant: Intel Products IP LLC, Santa Clara, CA (US)

(72) Inventors: Yi Wang, Beijing (CN); Debdeep Chatterjee, San Jose, CA (US); Yingyang Li, Beijing (CN); Gang Xiong, Beaverton, OR (US); Sergey Panteleev, Maynooth (IE); Salvatore Talarico, Los Gatos, CA (US)

(73) Assignee: Intel Products IP LLC, Santa Clara, CA (US)

( * ) Notice: Subject to any disclaimer, the term of this patent is extended or adjusted under 35 U.S.C. 154(b) by 110 days.

(21) Appl. No.: 18/726,874

(22) PCT Filed: Mar. 1, 2023

(86) PCT No.: PCT/US2023/014251
§ 371 (c)(1),
(2) Date: Jul. 5, 2024

(87) PCT Pub. No.: WO2023/172418
PCT Pub. Date: Sep. 14, 2023

(65) Prior Publication Data

US 2025/0184050 A1 Jun. 5, 2025

Related U.S. Application Data

(60) Provisional application No. 63/329,116, filed on Apr. 8, 2022, provisional application No. 63/318,682, filed on Mar. 10, 2022.

(51) Int. Cl.
*H04L 5/00* (2006.01)
*H04L 5/14* (2006.01)
(Continued)

(52) U.S. Cl.
CPC ............ *H04L 5/001* (2013.01); *H04L 5/0044* (2013.01); *H04L 5/14* (2013.01); *H04W 72/0453* (2013.01); *H04W 72/1263* (2013.01)

(58) Field of Classification Search
CPC ......... H04L 5/001; H04L 5/0044; H04L 5/14; H04W 72/0453; H04W 72/1263
See application file for complete search history.

(56) References Cited

U.S. PATENT DOCUMENTS

2020/0260442 A1 8/2020 Yi
2020/0383095 A1 12/2020 Moon et al.
(Continued)

FOREIGN PATENT DOCUMENTS

WO WO-2023172418 A1 9/2023

OTHER PUBLICATIONS

"International Application Serial No. PCT US2023 014251, International Preliminary Report on Patentability mailed Sep. 19, 2024", 6 pgs.
(Continued)

*Primary Examiner* — Khaled M Kassim
(74) *Attorney, Agent, or Firm* — Schwegman Lundberg & Woessner, P.A.

(57) ABSTRACT

A user equipment (UE) configured for operation in a fifth-generation new radio (5G NR) network may decode resource configuration information received from a generation Node B (gNB) for Non-Overlapping Sub-Band Full Duplex (NOSB-FD) communication. The resource configuration information may indicate downlink symbols within a carrier bandwidth for downlink communication, uplink symbols within the carrier bandwidth for uplink communication, and NOSB-FD symbols within the carrier bandwidth. Each NOSB-FD symbol may be configurable for both uplink and downlink communication. For any one of the NOSB-FD
(Continued)

symbols, one or more uplink subbands within the carrier bandwidth may be configurable to be allocated for uplink communication and one or more downlink subbands of the carrier bandwidth may be configurable to be allocated for downlink communication. The resource configuration information may be determined from a mapping of physical resource blocks (PRBs) to a common resource block (CRB) grid.

14 Claims, 11 Drawing Sheets

(51) Int. Cl.
*H04W 72/0453* (2023.01)
*H04W 72/1263* (2023.01)

(56) References Cited

U.S. PATENT DOCUMENTS

2021/0377926 A1* 12/2021 Li ............................ H04L 5/14
2021/0377938 A1* 12/2021 Huang .............. H04W 72/1263
2023/0113873 A1* 4/2023 Ibrahim ............... H04B 17/336 370/329
2023/0114039 A1* 4/2023 Manolakos ......... H04W 52/281 370/329
2023/0198667 A1* 6/2023 Abotabl ................ H04L 1/0073 714/726
2023/0209483 A1* 6/2023 Rudolf ................ H04W 56/001 370/503
2023/0275631 A1* 8/2023 Abdelghaffar ....... H04B 7/0691 375/267
2023/0292294 A1* 9/2023 Rudolf .............. H04W 72/0446
2024/0275569 A1* 8/2024 Abdelghaffar ............ H04L 5/14
2024/0340153 A1* 10/2024 Zhang ............... H04W 72/0446
2025/0266979 A1* 8/2025 Seok ......................... H04L 5/14
2025/0300704 A1* 9/2025 Choi ..................... H04L 5/0044
2026/0046070 A1* 2/2026 Chen ..................... H04L 1/1812

OTHER PUBLICATIONS

"International Application Serial No. PCT/US2023/014251, International Search Report mailed Jun. 20, 2023", 4 pgs.
"International Application Serial No. PCT/US2023/014251, Written Opinion mailed Jun. 20, 2023", 4 pgs.
CMCC, "Discussion on evolution of duplex operation", RP-211997, 3GPP TSG RAN Meeting #93-e, (Sep. 6, 2021), 8 pgs.
LG Electronics, "On the scope of Rel-18 study for full duplex operation", RP-211810, 3GPP TSG RAN Meeting #93-e, (Sep. 6, 2021), 8 pgs.
NEC, "Views on Rel-18 Evolution of Duplex Operation", RP-212435, 3GPP TSG RAN Meeting #93-e, (Sep. 6, 2021), 2 pgs.

* cited by examiner

BANDWIDTH PART (BWP) OPERATION AND COLLISION HANDLING FOR FULL DUPLEX COMMUNICATIONS

PRIORITY CLAIMS

This application is a U.S. National Stage Filing under 35 U.S.C. 371 from International Application No. PCT/US2023/014251, filed Mar. 1, 2023 and published in English as WO 2023/172418 on Sep. 14, 2023, which claims the benefit of priority to U.S. Provisional Patent Application Ser. No. 63/318,682, filed Mar. 10, 2022 [reference number AE1364-Z], and U.S. Provisional Patent Application Ser. No. 63/329,116, filed Apr. 8, 2022 [reference number AE3004-Z], which are incorporated herein by reference in their entireties.

TECHNICAL FIELD

Embodiments pertain to wireless communications. Some embodiments relate to full-duplex communication in wireless networks including 3GPP (Third Generation Partnership Project) and fifth-generation (5G) networks including 5G new radio (NR) (or 5G-NR) networks. Some embodiments relate to sixth-generation (6G) networks.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Time Division Duplex (TDD) is now widely used in commercial 5G NR deployments. For TDD, the time domain resource is split between downlink and uplink symbols. Allocation of a limited time duration for the uplink in TDD can result in reduced coverage and increased latency for a given target data rate. To improve the performance for UL in TDD, simultaneous transmission/reception of downlink and uplink respectively, also referred to as "full duplex communication" can be considered. There are various technical challenges to full-duplex communication that need to be addressed.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments pertain to collision handling for downlink (DL) reception and uplink (UL) transmission for full duplex communications. Some embodiments pertain to bandwidth part (BWP) operation for full duplex communication. These embodiments are described in more detail herein.

In some embodiments, a user equipment (UE) configured for operation in a fifth-generation new radio (5G NR) network may decode resource configuration information received from a generation Node B (gNB) for Non-Overlapping Sub-Band Full Duplex (NOSB-FD) communication. The resource configuration information may indicate downlink symbols within a carrier bandwidth for downlink communication, uplink symbols within the carrier bandwidth for uplink communication, and NOSB-FD symbols within the carrier bandwidth. Each NOSB-FD symbol may be configurable for both uplink and downlink communication. For any one of the NOSB-FD symbols, one or more uplink subbands within the carrier bandwidth may be configurable to be allocated for uplink communication and one or more downlink subbands of the carrier bandwidth may be configurable to be allocated for downlink communication. The resource configuration information may be determined from a mapping of physical resource blocks (PRBs) to a common resource block (CRB) grid. These embodiments, as well as others, are described in more detail below.

Figure 1A:
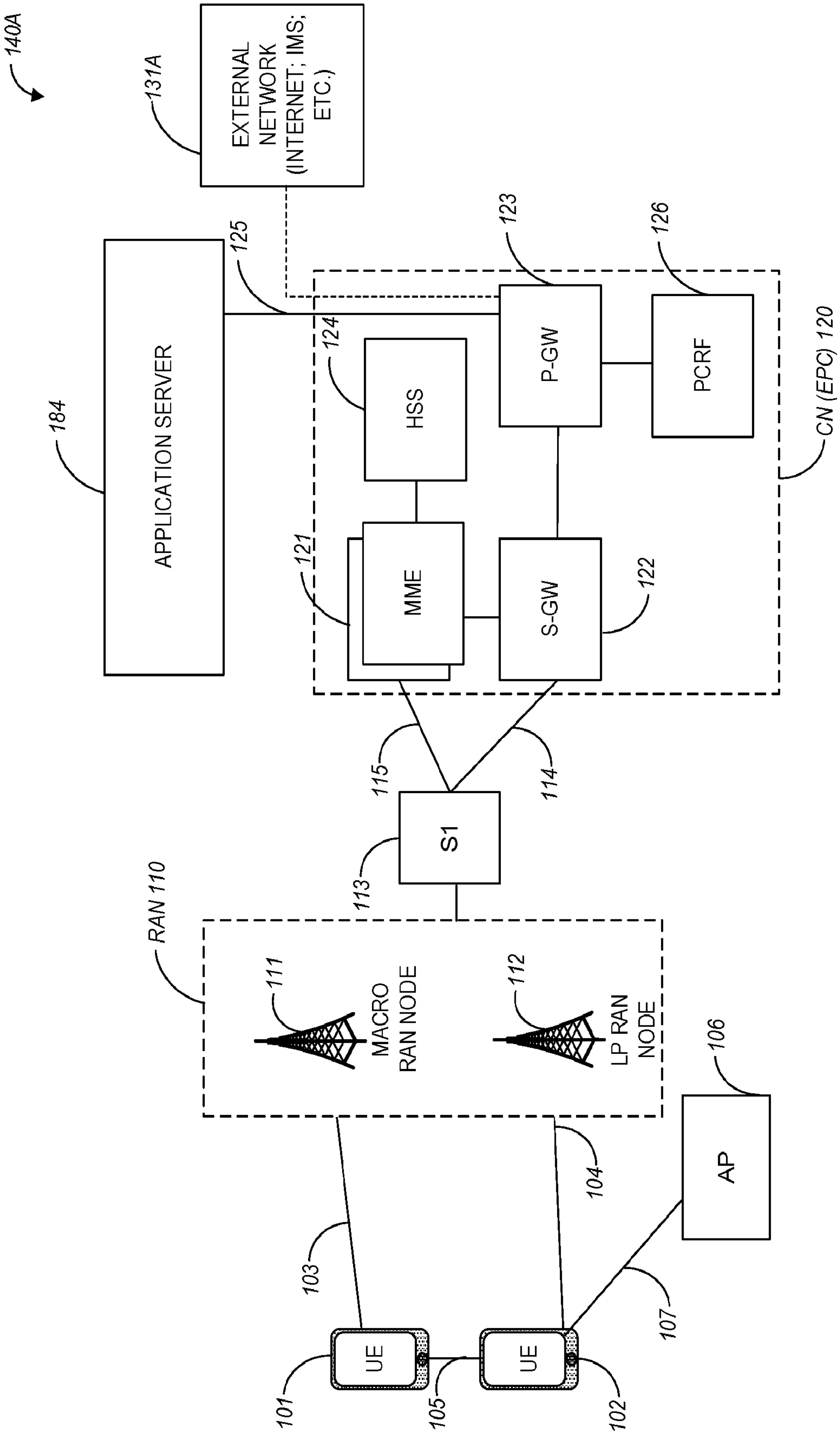
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHZ, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
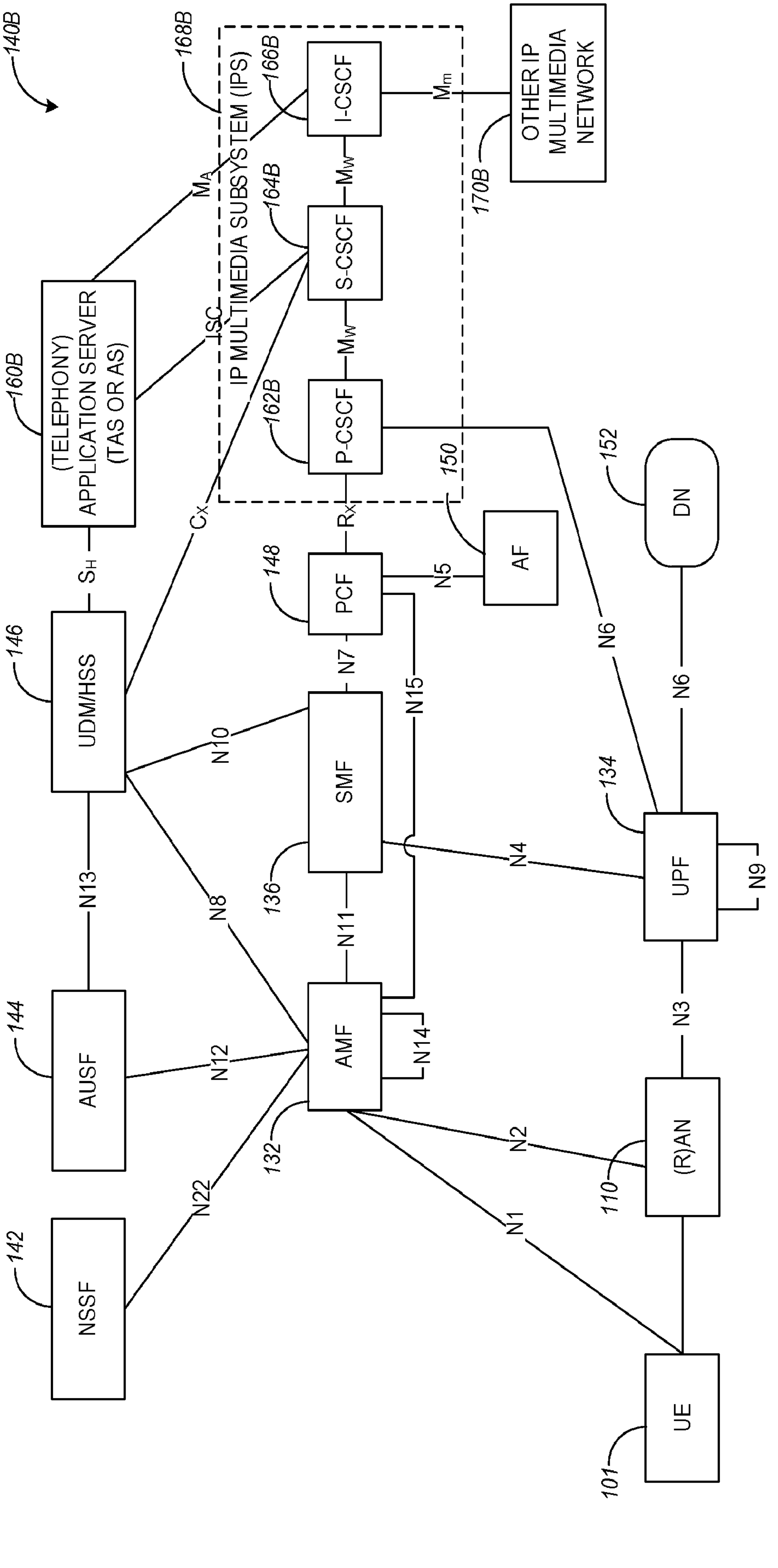
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF)

164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
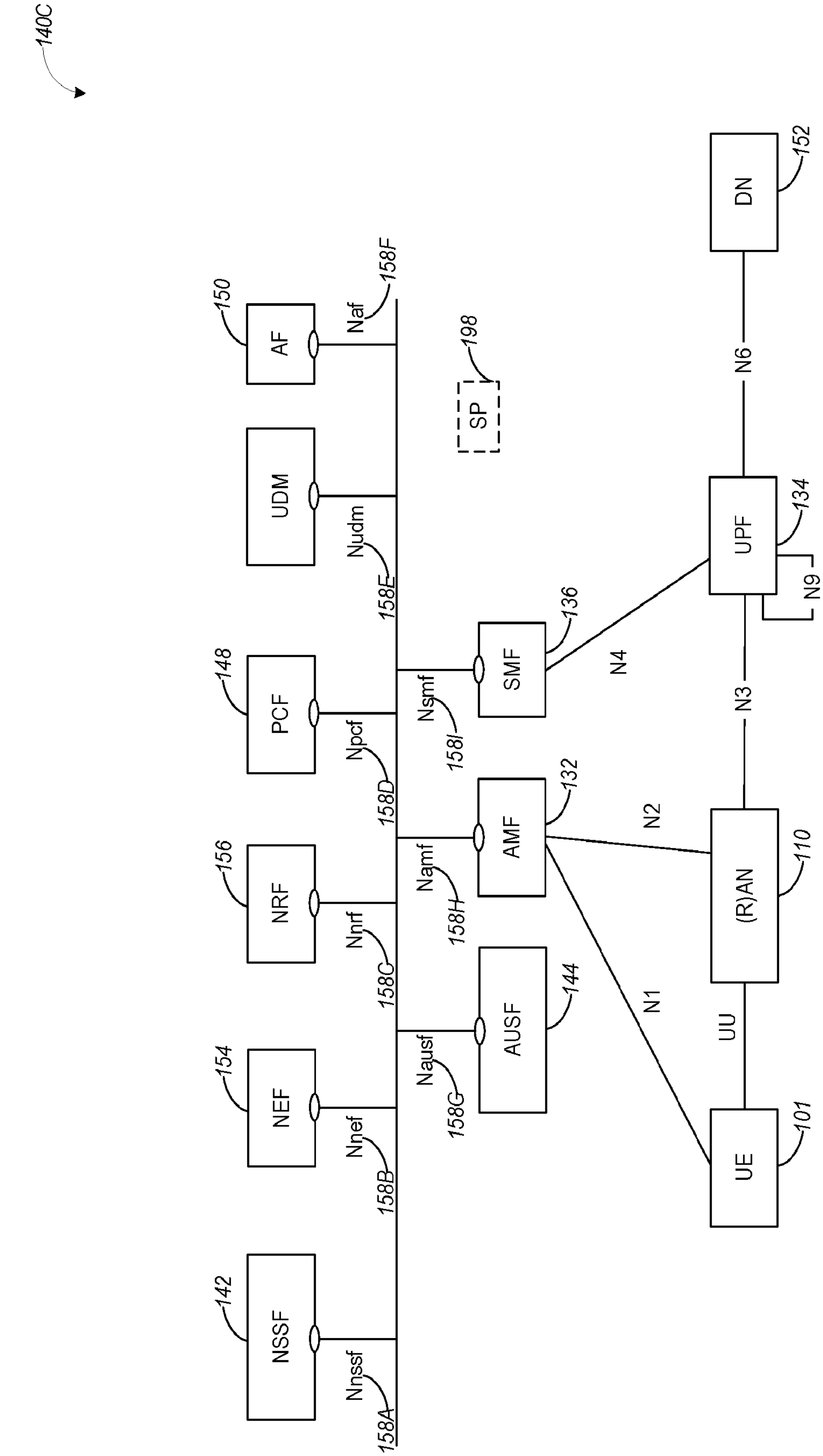

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points N1 or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

Time Division Duplex (TDD) is now widely used in commercial NR deployments. The time domain resource is split between downlink and uplink symbols. Allocation of a limited time duration for the uplink in TDD can result in reduced coverage and increased latency for a given target data rate. To improve the performance for UL in TDD, simultaneous transmission/reception of downlink and uplink respectively, also referred to as "full duplex communication" can be considered. In this regard, the case of Non-Overlapping Sub-Band Full Duplex (NOSB-FD) at the gNB is expected to be studied further in 3GPP.

For NOSB-FD, within a carrier bandwidth, some bandwidth can be allocated as UL, while some bandwidth can be allocated as DL within the same symbol, however the UL and DL resources are non-overlapping in frequency domain. Under this operational mode, at a given symbol a gNB can simultaneously transmit DL signals and receive UL signals, while a UE may only transmit or receive at a time.

For a UE not aware of support of NOSB-FD at the gNB, the UE may only identify DL or UL resources in a symbol. For a UE that may be provided with the information of NOSB-FD operations at gNB, the UE may identify both DL and UL resources in a symbol. For such UE, new scheduling restrictions and/or UE behavior may be defined to enable the UE to decide whether to transmit or receive in a symbol with both DL and UL resources. Some embodiments disclosed herein focus on the determination of whether to transmit or receive in a symbol with both DL and UL resources. Some embodiments disclosed herein provide the rule to resolve DL and UL resource collision in different sub-band in a symbol. These embodiments may:

- Resolve the collision between cell-specific DL signals and cell-specific/UE group specific UL signals.
- Resolve the collision between cell-specific DL or UL signals and UE-specific UL or DL signals.
- Resolve the collision between UE-specific UL and DL signals.

DL/UL Resource Configuration in a Full Duplex System

Figure 1D:
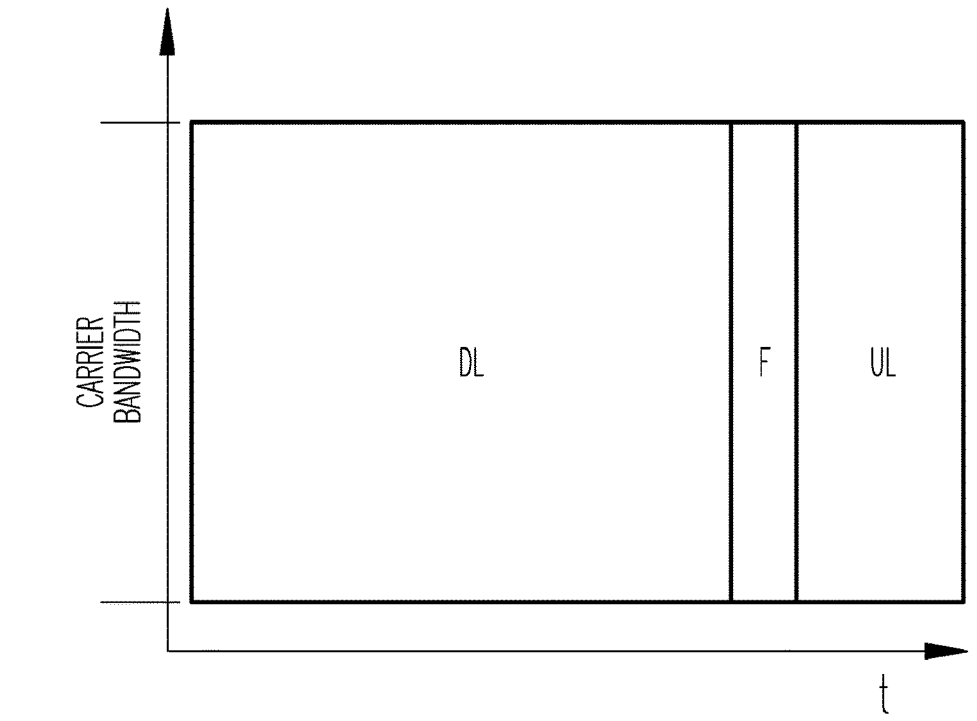
FIG. 1D illustrates unidirectional DL/UL resource allocation in a serving cell, in accordance with some embodiments.

For a serving cell, DL/UL resources can be configured unidirectionally in time domain. The time domain granularity can be an OFDM symbol. In NR Rel-15/16/17, a symbol can be either a DL symbol, or an UL symbol, or flexible symbol (illustrated with an F) as shown via the example in FIG. 1D. Further, such attribution between DL/UL/Flexible can be indicated to a UE via semi-static or dynamic signaling with some differences in UE behavior for handling of Flexible symbols depending on the whether the indication is based on semi-static configuration or dynamic signaling (e.g., using DCI format 2_0).

For a serving cell with NOSB-FD operation, a symbol can be used to map both DL and UL physical channels or signals. Thus, for a given PRB in a symbol, the resources may be identified as DL, UL, or flexible resources as illustrated in FIG. 2.

Figure 2:
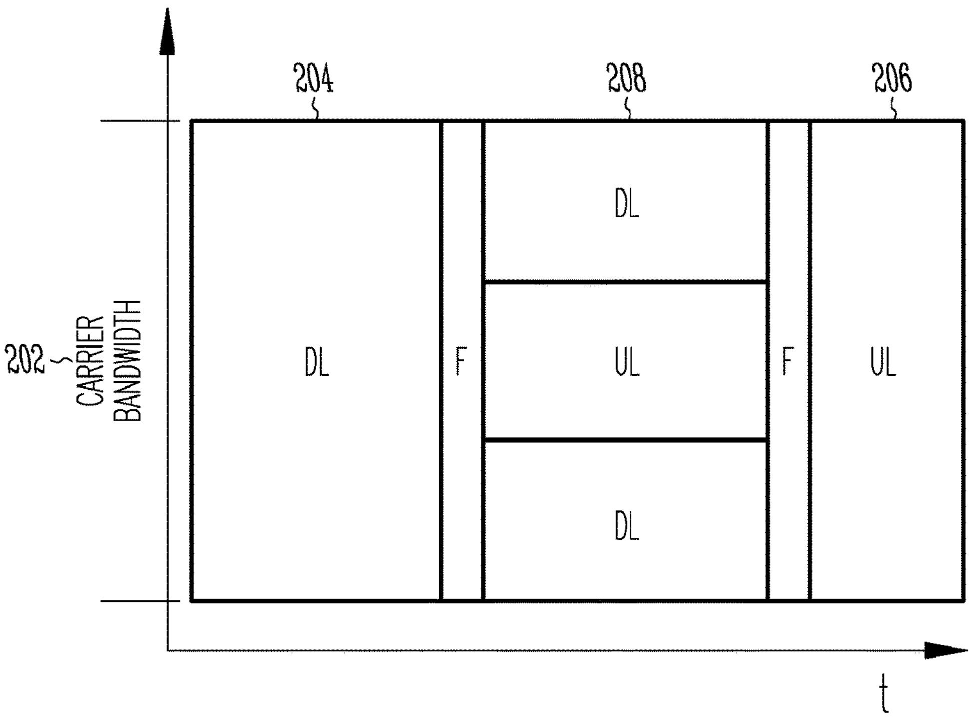
FIG. 2 illustrates Non-overlapping Sub-band Full Duplex (NOSB-FD)-based DL/UL resource allocation in a serving cell, in accordance with some embodiments.

FIG. 2 illustrates one example of Non-Overlapping Sub-Band Full Duplex (NOSB-FD) for NR system. In FIG. 2, in the NOSB-FD symbols, part of carrier bandwidth is allocated for DL while remaining part of carrier bandwidth is allocated for UL. Other symbols are regular symbols. A regular symbol is for DL transmission only or for UL transmission only. A regular symbol may be a DL or UL symbol that is semi-statically configured by higher layer signaling (e.g., tdd-UL-DL-ConfigurationCommon or tdd-UL-DL-ConfigurationDedicated). A regular symbol may be a DL or UL symbol that is dynamically indicated by DCI format 2_0 (slot format indication). Further, a regular symbol may be a flexible symbol configured by the high layer signaling or indicated by DCI format 2_0 if it is not configured or indicated as a NOSB-FD symbol.

As shown in FIG. 2, in a symbol, frequency resources may be divided into DL/UL/Flexible resources in different non-overlapped sub-bands. Here and in the rest of the disclosure, a "sub-band" corresponds to a set of physical resources within a carrier that are contiguous in frequency, e.g., a number of consecutive Physical Resource Blocks (PRBs) on the Common Resource Block (CRB) grid.

In the following, a "symbol with potential NOSB-FD operation" (may also be referred to as "Full Duplex (FD) symbol for brevity) implies a symbol in which the gNB may transmit in the DL and receive in the UL simultaneously. Such a symbol may be identified by a UE based on configuration of sub-bands (e.g., when configured with at least one DL and at least one UL sub-band in the symbol), or based on one or more of: TDD configuration, dynamic slot formats (via DCI format 2_0), higher layer configuration, or dynamic L1 signalling of transmission or reception occasions.

In these embodiments, for Non-Overlapping Sub-Band Full Duplex (NOSB-FD) operation within a carrier bandwidth 202 (see FIG. 2), some symbols 206 of the carrier bandwidth are allocated for uplink communication, some symbols 204 of the carrier bandwidth are allocated for downlink communication, and some symbols of the carrier bandwidth comprise FD symbols (i.e., NOSB-FD symbols) 208. For the NOSB-FD symbols 208, part of the carrier bandwidth (i.e., a subband) is allocated for uplink and another part of the carrier bandwidth (i.e., another subband) is allocated for downlink.

In one embodiment, the configuration of sub-bands may be provided to a UE via explicit or implicit configuration. In one option, the sub-band configuration can be provided to the UE via UE-specific Radio Resource Control (RRC) signaling. In another option, the sub-band configuration can be provided to the UE via system information (S1), e.g., in RMSI (SIB1). In another option, the sub-band configuration can be provided to the UE via slot format information in DCI, e.g., SFI by DCI 2_0. The sub-band can be configured as DL, UL or Flexible SBs, or either DL or UL SBs, or either UL or Flexible SBs, or only as UL SBs. If a sub-band is not explicitly configured as one of DL, UL or Flexible SBs, the sub-band can be implicitly identified as Flexible SB in a flexible symbol, or as DL SB in a DL symbol, or as UL SB in a UL symbol respectively.

In another embodiment, a UE may not be configured with sub-bands for symbols with potential NOSB-FD operation (i.e., symbols with both DL and UL resources). The UE is expected to determine link direction in each symbol based on one or more of: provided information on DL/UL/Flexible symbols (UL-DL TDD configuration), semi-statically configured DL/UL reception/transmission (respectively) occasions via cell-specific or UE-specific RRC signaling, and dynamic Layer 1 (L1) signaling.

In one example, symbols containing both DL and UL sub-bands (FD symbols) can only be semi-static flexible symbols configured by UL-DL TDD configuration or when UL-DL TDD configuration is not provided. In this case, a UE is not expected to be configured with symbols containing both DL and UL sub-bands (FD symbols) overlapping with semi-static DL or semi-static UL symbols. In case of dynamic UL-DL slot format indication by DCI format 2_0, a UE applies dynamic DL or UL symbols configuration to the symbols indicated to contain both DL and UL sub-bands, and thus those symbols become DL-only or UL-only. Alternatively, a UE may be configured to ignore any dynamic UL-DL slot format indication by DCI format 2_0 for a FD symbol.

Figure 3A:
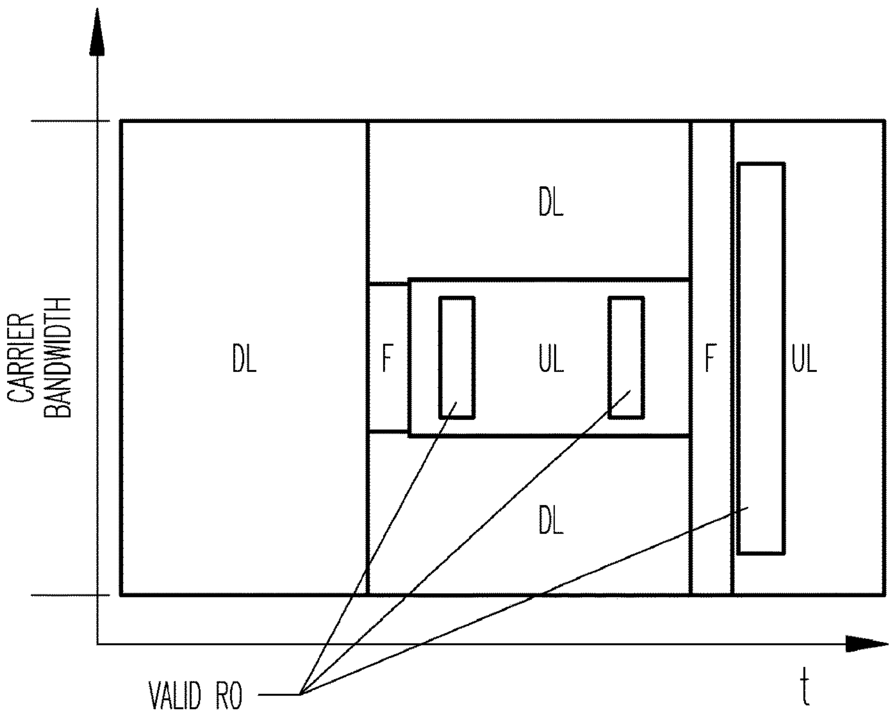
FIG. 3A illustrates one set of valid RO in UL only symbol, and one set of valid RO in UL sub-band in a symbol containing both DL and UL sub-band, in accordance with some embodiments.

In one example, to improve RACH performance, e.g., reduce latency or better support of PRACH repetitions, a gNB can configure one or multiple sets of random-access parameters. For at least one set of random-access parameters, a PRACH/PUSCH occasion is valid, if the PRACH occasion is within UL symbols, or it does not precede a SS/PBCH block in the PRACH slot and starts at least $N_{gap}$ symbols after a last downlink symbol and at least $N_{gap}$ symbols after a last SS/PBCH block symbol. For at least one set of random-access parameters, a valid PRACH occasion or PUSCH occasion is within UL symbols, or in flexible symbols which do not precede a SS/PBCH block in the PRACH slot and starts at least $N_{gap}$ symbols after a last downlink symbol and at least $N_{gap}$ symbols after a last SS/PBCH block symbol, and it can also be in a symbol containing both UL and DL/Flexible resources if the PRACH/PUSCH frequency resource is within the UL resource or flexible resource, or within the UL resources, as shown in FIG. 3A. In a specific symbol, the UE may also be semi-statically configured with a DL reception occasion or dynamically scheduled for a DL reception. Then, a rule may be needed for a UE to determine whether to receive DL or transmit UL during the RACH procedure, e.g., PRACH, MsgA PUSCH.

In one example, in a symbol containing cell-specific DL signals, e.g., SS/PBCH, the symbol may also contain UL resources. In a specific symbol, the UE may also be configured with UL transmission occasion or dynamically scheduled for a UL transmission. Then, a rule may be needed for a UE to determine whether to receive cell-specific DL, e.g., receive SS/PBCH, or transmit UL. Alternatively, a symbol containing cell-specific DL signals that may include at least SS/PBCH block and/or CORESET #0 monitoring occasions may not be identified as "FD symbols".

In another example, a gNB may semi-statically configure UE-specific UL transmission or UE-specifically or cell-specifically indicated DL reception in a symbol. A gNB may also dynamically schedule a DL reception or UL transmission in the symbol. In another example, gNB may semi-statically configure both UE-specific UL transmission and UE-specifically indicated DL reception in a symbol. Then, additional UE behaviors and expectations may be defined for a UE to determine whether to perform DL reception or a UL transmission.

Figure 3B:
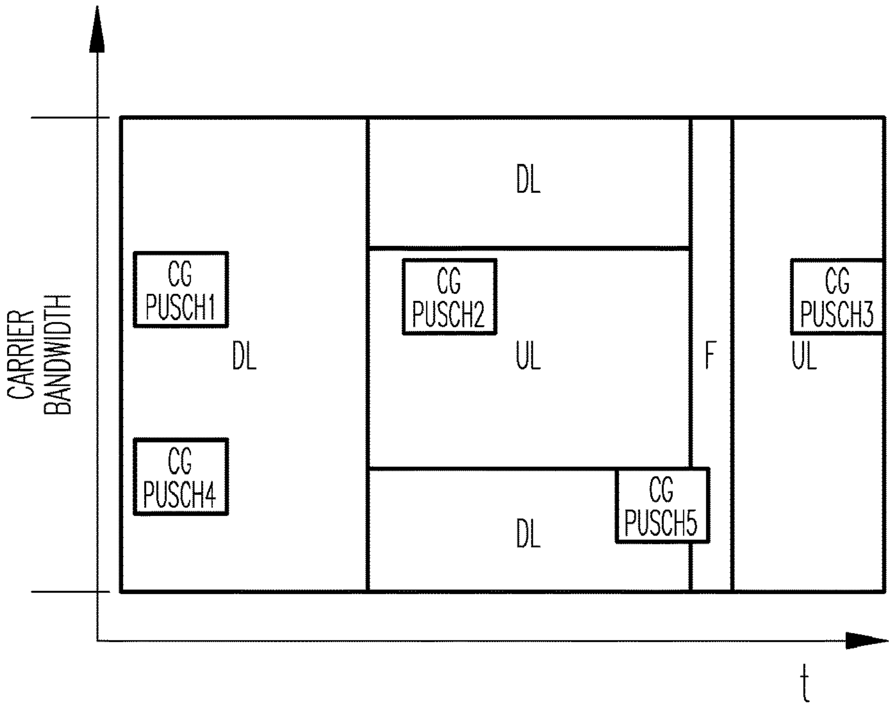
FIG. 3B illustrates CG PUSCH configured in DL or UL only symbol, and in a symbol containing both DL and UL sub-band, in accordance with some embodiments.

In general, a gNB may semi-statically configure UL transmission in DL resource or UL resource. The UE does not transmit a UL signal/channel when the UL signal/channel overlaps, even partially, with the DL resource. A gNB may semi-statically configure DL reception in DL resource or UL resource. The UE does not receive a DL signal/channel when the DL signal/channel overlaps, even partially, with the UL resource. As shown in FIG. 3B, UE does not transmit CG PUSCH 1, CG PUSCH 4 and CG PUSCH 5. Alternatively, UE does not expect a UL transmission to overlap with DL resource, and the UE does not expect a DL transmission to overlap with UL resource. Alternatively, UE can partially receive the DL or partially transmit the UL in PRBs not overlapped with the UL resource or DL resource.

DL/UL Transmission Collision Handing in a Full Duplex System

Embodiments of handling DL/UL transmission collision in full duplex system are provided as follows:

In the following, if a UE is provided with configurations of DL or UL sub-bands, a DL reception or UL transmission for DL/UL transmission collision handling focuses on the DL reception and UL transmission occasion confined to within a DL and UL sub-band respectively.

Figure 4A:
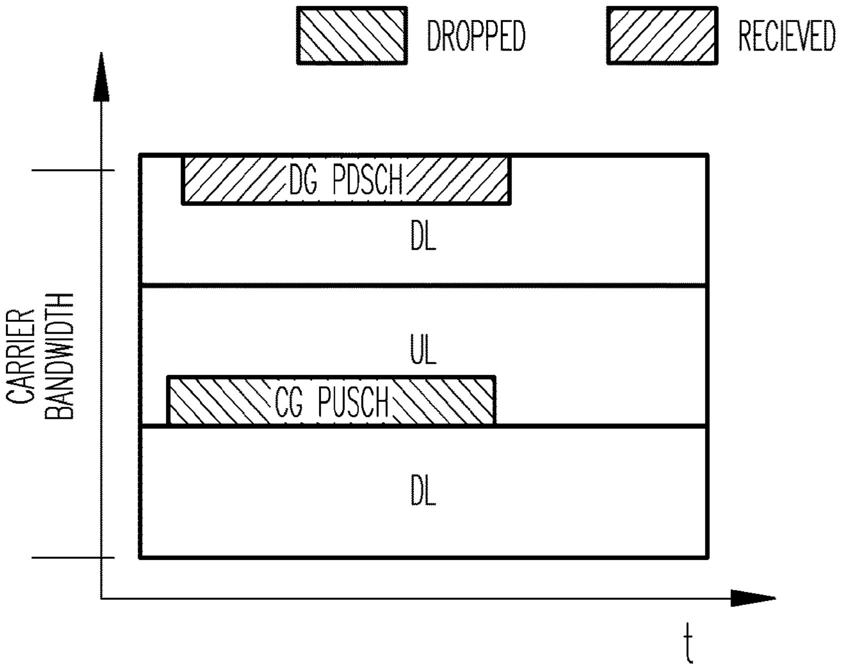
FIG. 4A illustrates in a symbol with potential NOSB-FD operation, a UE configured by higher layers with a UE-specific UL transmission occasion, while the UE may also be dynamically scheduled for a DL reception, in accordance with some embodiments.

In one embodiment, in a symbol with potential NOSB-FD operation, a UE can be configured by higher layers with a UE-specific UL transmission occasion, while the UE may also be dynamically scheduled for a DL reception. The UE drops the configured UE-specific UL transmission and receives scheduled DL, as shown in FIG. 4A. In other words, dynamically scheduled downlink reception has higher priority than the UE-specific uplink transmission configured by higher layers. Note that the dynamically scheduled DL reception may include, but is not limited to:

- A PDSCH transmission associated with a downlink control information (DCI);
- A channel state information reference signal (CSI-RS) associated with a DCI.

Figure 4B:
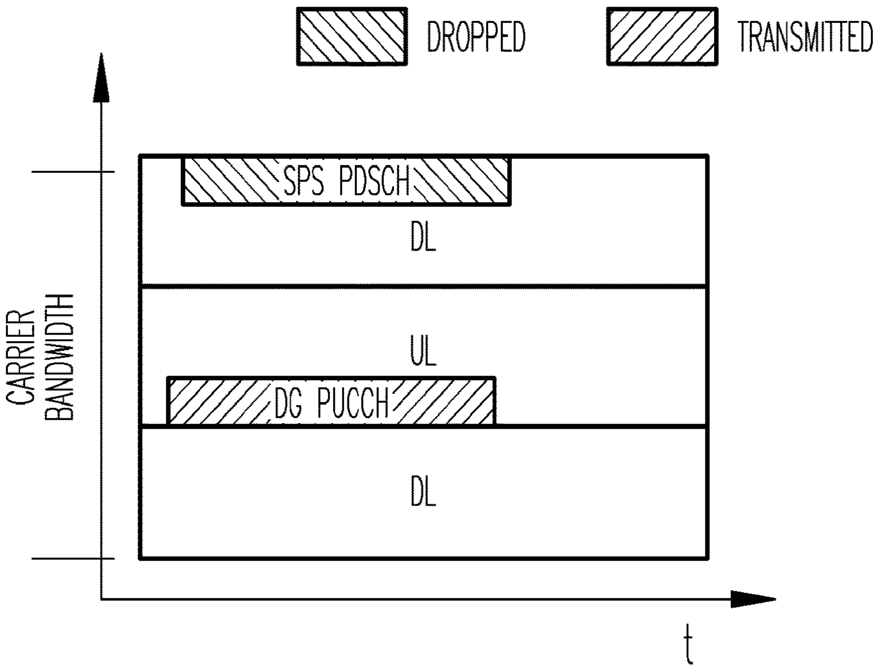
FIG. 4B illustrates in a symbol with potential NOSB-FD operation, a UE can be configured by higher layers with UE-specific DL reception, while the UE can be dynamically scheduled for an UL transmission, in accordance with some embodiments.

The UE-specific uplink transmission occasion configured by higher layers may include, but is not limited to:

- PRACH;
- PUCCH carrying periodic or semi-persistent channel state information (CSI), scheduling request (SR), HARQ-ACK feedback in response to a PDSCH without associated DCI (SPS PDSCH HARQ-ACK)
- PUSCH without associated DCI, e.g., Type 1 CG-PUSCH or Type 2 CG-PUSCH other than the first PUSCH associated with activation DCI.
- CG PUSCH for small data transmission (SDT)
- Sounding reference signal (SRS) without associated DCI, e.g., P-SRS or SP-SRS In one embodiment, in a symbol with potential NOSB-FD operation, a UE can be configured by higher layers with UE-specific DL reception, while the UE can be dynamically scheduled for an UL transmission. The UE drops the configured UE-specific DL reception and transmits scheduled UL, as shown in FIG. 4B. In other words, dynamically scheduled uplink transmission has higher priority than UE-specific downlink reception configured by higher layer. Note that the dynamically scheduled uplink transmission may include, but is not limited to:

- A PUSCH transmission associated with a DCI;
- PUCCH carrying dynamic HARQ-ACK feedback in response to a PDSCH with associated DCI, or in response to a PDCCH;
- SRS transmission with associated DCI;
- PRACH transmission which is based on PDCCH ordered.

The UE specific downlink reception configured by higher layers may include, but is not limited to:

- A PDSCH transmission without associated DCI;
- A CSI-RS transmission without associated DCI;
- A DL PRS;
- A PDCCH.

In one embodiment, in a symbol with potential NOSB-FD operation, a UE can be configured by higher layers with cell-specific UL transmission occasion and be configured with cell-specific DL reception, it is up to UE to decide to receive DL or transmit UL. Alternatively, UE drops DL reception and transmit UL. Alternatively, UE does not expect to be configured with cell-specific UL transmission and cell-specific DL reception in the same symbol.

Note that cell-specific uplink transmission occasion configured by higher layer may include, but is not limited to: PRACH configured by cell-specific higher layer signaling, e.g., in SIB1, and Msg A configured by cell-specific higher layer signaling Note that cell-specific DL reception configured by higher layer may include, but is not limited to:

- SS/PBCH configured by cell-specific higher layer signaling, e.g., in ServingCellConfigCommon or in SIB1
- Type0-PDCCH CSS configured by MIB
- Type 0/0A/1/2 CSS with searchSpaceId=0
- Type 0/0A/1/2 CSS configured by cell-specific higher layer signaling.

In one embodiment, in a symbol with potential NOSB-FD operation, a UE can be configured with UE-specific UL transmission for RRC inactive or RRC idle state and be configured with cell-specific DL reception, it is up to UE to decide to receive DL or transmit UL. Alternatively, UE drops DL reception and transmit UL. Alternatively, UE does not expect to be configured with UE-specific UL transmission for RRC inactive or RRC idle state and cell-specific DL reception in the same symbol. The UE-specific UL transmission for RRC inactive or RRC idle state may include but is not limited to configured grant based PUSCH on initial UL BWP for small data transmission.

For example, in a symbol, UE is configured with SS/PBCH and it is configured with valid RO/PO, however it would be up to the UE to receive SS/PBCH or transmit PRACH PUSCH/MsgA PUSCH or CG-PUSCH for SDT in valid RO/PO.

In another example, the UE may be configured with Type 0/0A/1/2 CSS and also configured with valid RO/PO, and in this case UE drops Type 0/0A/1/2 CSS in DL sub-band and transmits PRACH/MsgA PUSCH or CG-PUSCH for SDT operation in valid RO/PO.

In one embodiment, in a symbol with potential NOSB-FD operation, a UE can be configured with cell-specific UL transmission and the UE can be dynamically scheduled with DL reception, however it is up to the UE to decide to receive the DL or transmit the UL. Alternatively, UE receives the DL and does not transmit PRACH/MsgA PUSCH or CG-PUSCH for SDT operation in the RO/PO. Alternatively, UE transmits PRACH/MsgA PUSCH or CG-PUSCH for SDT operation in the RO/PO and UE does not receive the DL.

In one embodiment, in a symbol with potential NOSB-FD operation, a UE can be configured with UE-specific DL reception and the UE can be configured with cell-specific UL transmission, however it is up to UE to decide to receive the DL or transmit the UL. For example, UE is configured with CSI-RS and configured with valid RO/PO, and in this case it is up to UE to receive the CSI-RS or transmit PRACH/Msg1 PUSCH/MsgA PUSCH or CG-PUSCH for SDT operation in valid RO/PO. Alternatively, UE receives the DL and UE does not transmit the UL. Alternatively, UE receives the DL and UE does not transmit the UL, if the DL reception is associated with high priority, e.g., priority index=1. Alternatively, UE can transmit PRACH/Msg1 PUSCH/MsgA PUSCH or CG-PUSCH for SDT operation in valid RO/PO and does not receive the DL. Alternatively, gNB configures whether to receive DL in case of collision with UL in a symbol. Alternatively, UE does not expect to be configured with UE-specific DL reception and cell-specific UL transmission in the same symbol.

In one embodiment, in a symbol with potential NOSB-FD operation, UE does not expect to be configured with UE-specific UL transmission and cell-specific DL reception for PDCCH in Type 0/0A/1/2 CSS in the same symbol. Alternatively, in the symbol, a UE can be configured with cell-specific DL reception for PDCCH in Type 0/0A/1/2 CSS and the UE can be configured with UE-specific UL transmission, and it is up to UE to decide to receive the DL or transmit the UL. Alternatively, UE transmits the UL and UE does not receive the DL. Alternatively, UE transmits the UL and UE does not receive the DL, if the UL transmission is associated with high priority, e.g., priority index=1. Alternatively, the gNB configures whether to transmit the UL in such a case.

In one embodiment, in a symbol with potential NOSB-FD operation, a UE can be configured with cell-specific DL reception for PDCCH in Type 0/0A/1/2 CSS while the UE can be dynamically scheduled for an UL transmission, the UE drops the configured DL reception and transmits the scheduled UL.

In one embodiment, in a symbol with potential NOSB-FD operation, a UE can be configured with UE-specific UL transmission and the UE can be configured with cell-specific SS/PBCH reception, and UE does not transmit the UL. The cell-specific SS/PBCH is the SS/PBCH determined by ssb-PositionsInBurst in SIB1 or ssb-PositionsInBurst in ServingCellConfigCommon. Alternatively, UE transmits the UL and UE does not receive the DL. Alternatively, UE transmits the UL and UE does not receive the DL, if the UL transmission is associated with high priority, e.g., priority index=1. Alternatively, gNB configures whether to transmit the UL in such a case. Alternatively, it is up to UE to decide to receive the DL or transmit the UL. Alternatively, UE does not expect to be configured with UE-specific UL transmission and cell-specific SS/PBCH reception in the same symbol.

In one embodiment, in a symbol with potential NOSB-FD operation, a UE can be dynamically scheduled with UE-specific UL transmission and the UE can be configured with cell-specific SS/PBCH reception, and UE does not transmit the UL. Alternatively, UE transmits the UL and does not receive the DL. Alternatively, the UE transmits the UL and does not receive the DL, if the UL is Msg 3 PUSCH or PUCCH for Msg 4, otherwise, the UE does not transmit the UL.

In one embodiment, in a symbol with potential NOSB-FD operation, a UE can be configured with UE-specific UL transmission and the UE can be configured with UE-specific DL reception, and in this case the UE determines to receive or transmit according to at least one of the following rules:

If the UL transmission is associated with higher priority and DL reception is associated with lower priority or without any associated priority, UE transmits UL and does not receive DL. If the UL transmission is associated with lower priority and DL reception is associated with higher priority, the UE receives DL and does not transmit UL. The priority can be configured by higher layer signaling, e.g., priority index=0 is low priority, and priority index=1 is high priority.

If the UL transmission and DL reception are associated with same priority or both are not associated with priorities or one is associated with low priority and another is not associated with any priority, it is up to UE transmit the UL or receive the DL.

If the DL reception is PDCCH reception in specific search space set, or, the PDCCH reception is associated with specific DCI format, a UE receives DL and does not transmit UL. For example, the specific DCI format is DCI format 2_0 for SFI, or DCI format 2_1 for downlink preemption, or DCI format 2_4 for UL cancellation. For example, the specific search space set is Type-3 CSS. Alternatively, if the DL reception is PDCCH reception, UE receives DL and does not transmit UL.

Alternatively, a UE does not expect to be configured with UE-specific UL transmission and UE-specific DL reception in the same symbol. Alternatively, a UE does not expect to be configured with UE-specific UL transmission and DL reception with same priority index. Alternatively, a UE does not expect to be configured with UE-specific UL transmission and PDCCH reception in the same symbol.

In one embodiment, a UE does not expect to be dynamically scheduled for both UL and DL in the same symbol.

In one embodiment, the DL or UL sub-band discussed above can be replaced with a flexible sub-band. For example, a UE can be configured with UL transmission in an UL sub-band and DL reception in a flexible sub-band, or a UE can be configured with UL transmission in a flexible sub-band and DL reception in a DL sub-band, in the same symbol. All the mechanisms discussed above may also apply in this case. Alternatively, a UE drops the DL reception in the flexible sub-band and a UE transmits UL in the UL sub-band, or a UE drops the UL transmission in the flexible sub-band and a UE receives DL in the DL sub-band. Alternatively, a UE drops the DL reception in the flexible sub-band and UE transmits UL in the UL sub-band, or a UE drops the UL transmission in the flexible sub-band and UE receives DL in the DL sub-band, if the DL reception/UL transmission in the flexible sub-band is UE-specific configured for reception/transmission. In another example, UE does not expect to be configured with UL transmission and DL reception in flexible sub-band in the same symbol.

Alternatively, in the above embodiments, if a UE decides to cancel the UL transmission according to reception of a DCI format, the UE does not expect to cancel the UL transmission if the gap between the received DCI format and the UL transmission is smaller than the minimum processing time for the corresponding UL cancellation mechanism, e.g., based on the minimum UE processing time for PUSCH preparation $T_{proc,2}$ as defined in TS 38.213 and TS 38.214.

In one embodiment, a UE may be configured or scheduled for a DL reception and an UL transmission in different sub-bands in different symbols and the gap between these symbols is not sufficient for the switching. In one example, if the UL transmission is cell-specific UL, e.g., valid RO/PO, it is up to UE to drop the DL reception or drop the UL transmission, if the gap between the DL and UL is not sufficient for the switching. In another example, if the UL transmission is UE-specific UL and the DL is cell-specific DL, e.g., SS/PBCH, a UE drops the UL transmission, if the gap between the DL and UL is not sufficient for the switching. In another example, a UE does not expect the gap between the DL and UL to not be sufficient for the switching, if the DL and UL are both UE-specific configured transmissions.

Some embodiments Disclosed herein relate to for bandwidth part (BWP) operation in NOSB-FD symbols and regular symbols for duplex operation. These embodiments propose:

- UL resource configured in NOSB-FD symbols and regular symbols
- DL resource configured in NOSB-FD symbols and regular symbols
- Joint consideration of DL resource and UL resource in TDD In a regular symbol, all the frequency resources can be either used for DL transmission only or for UL transmission only. On the other hand, in a NOSB-FD symbol with both DL and UL resources, the DL or UL transmission is limited to the DL or UL resource, respectively. This results in a limitation on DL or UL BWP operation caused by the NOSB-FD symbols. A DL and UL BWP can be configured in the carrier bandwidth, which applies at least in the regular DL, UL, or Flexible symbols in which a single link direction can be mapped. On the other hand, it is possible that only a subset of the DL or UL resource can be applicable for DL or UL transmission respectively in NOSB-FD symbols for a UE. The above applicable DL or UL resource may be referred as a DL or UL subband (SB), or a DL or UL BWP.

The above applicable DL or UL frequency resource and the corresponding interference level in a NOSB-FD symbol can be different from a regular symbol. Correspondingly, the suitable DL and/or UL transmission parameters can be different. Specifically, the applicable filters at the UE for UL transmission or DL reception in a NOSB-FD symbol may be different from that of a regular symbol. Note: According to Rel-15 NR specifications, in TDD deployments, the DL BWP and UL BWP with the same BWP indices may have different number of PRBs but always have aligned center frequency.

No Separate UL BWP for NOSB-FD Symbols

A UL BWP can be configured within the carrier bandwidth and an associated UL subband (UL SB) can be further configured or derived. The associated UL SB should be allocated within the UL frequency resource in NOSB-FD symbols and defines the frequency resources that an UL transmission in a NOSB-FD symbol may be limited to. In one option, UE may not know the exact UL frequency resource region in NOSB-FD symbols.

In a typical case, the associated UL SB may be a subset of or equal to the UL BWP. Alternatively, the UL BWP may be configured within the associated UL SB. For a UE supporting multiple UL BWPs, the different UL BWPs of a UE may be associated with same or different UL SBs. If a UL BWP is activated for the UE, the associated UL SB also becomes applicable based on the configuration or scheduling.

As yet another alternative, an UL SB for a NOSB-FD symbol may be a subset of or equal to a DL BWP. Since the UL SB in NOSB-FD symbol are effectively frequency resources for UL transmission within an otherwise "DL symbol", limiting the UL SB to within the associated DL BWP can help in enabling better coexistence with UEs not supporting NOSB-FD operations. According to this alternative, UL subband configuration for a NOSB-FD symbol may be associated with a configured DL BWP as well. Note that, for a DL and UL BWP pair with same BWP index, the UL SB can be seen as associated with both DL and UL BWPs.

As a further alternative, an UL SB for a NOSB-FD symbol may be included within both DL and BWPs with the same BWP index.

An UL BWP and the associated UL SB may have aligned center frequency, which is also aligned with the center frequency of the DL BWP. On the other hand, it may be allowed that the center frequency of the associated UL SB can be different from the UL BWP, if only the associated UL SB is a subset of the UL BWP. Then, it may be up to UE implementation to handle the mismatch.

Figure 5:
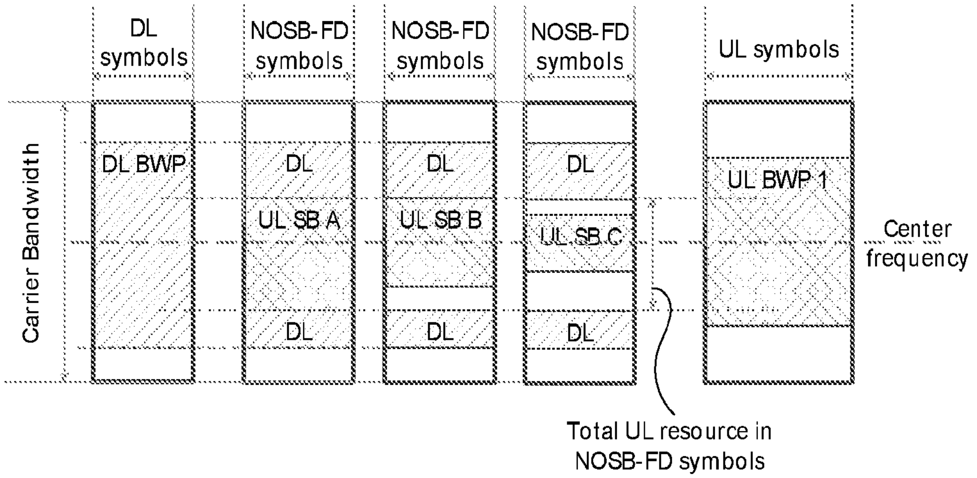
FIG. 5 illustrates a configuration of UL BWPs and the associated UL SBs, in accordance with some embodiments.

FIG. 5 illustrates one example of configuration of the UL BWP and multiple configurations of associated UL SBs. In FIG. 5, the total UL resource in NOSB-FD symbols is within the UL BWP. The multiple UL SBs are configured within the total UL resource in NOSB-FD symbols. For UL SB B or C, it has the same center frequency as the UL BWP, which is aligned with the DL BWP too. For UL SB A, it includes all the UL resource in NOSB-FD symbols, which results in that the center frequency of UL SB A is not aligned with the UL BWP. However, it may be a UE capability to handle such mismatch.

Figure 6:
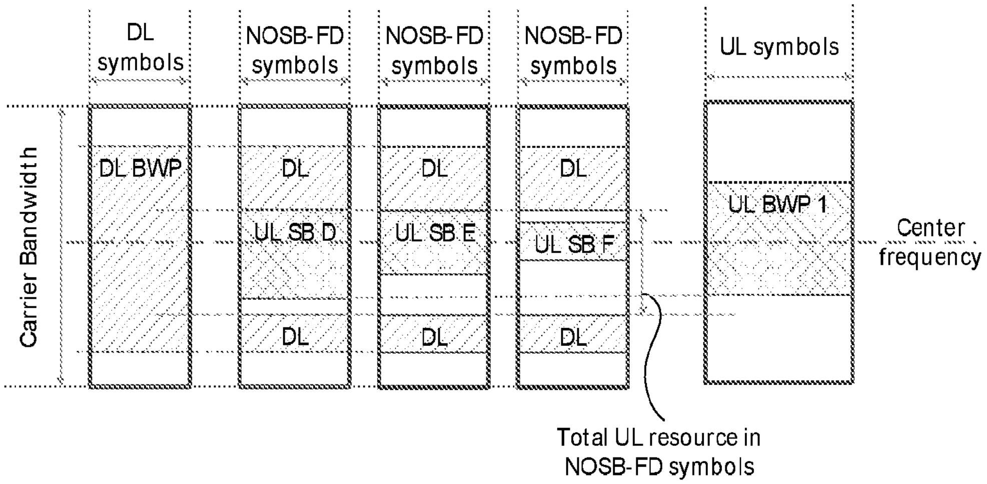
FIG. 6 illustrates a configuration of UL BWPs and the associated UL SBs, in accordance with some embodiments.

FIG. 6 illustrates another example of configuration of the UL BWP and the associated UL SB. In FIG. 6, the total UL resource in NOSB-FD symbols is partially overlapped with the UL BWP. The multiple UL SBs are configured within the total UL resource in NOSB-FD symbols. For UL SB E or F, it still has the same center frequency as the UL BWP, which is aligned with the DL BWP too. For UL SB D, it includes all the UL resource in NOSB-FD symbols within the UL BWP, which results in that the center frequency of UL SB D is not aligned with the UL BWP. However, it may be a UE capability to handle such mismatch.

In one embodiment, for the configuration of the associated UL SB, some parameters may be separately configured for the associated UL SB, while other parameters may reuse the configuration for the UL BWP. In one example, only the locationAndBandwidth parameter may be separately provided for the associated UL SB while the remaining parameters may be reused from those provided for the corresponding UL BWP. In another example, the subcarrier spacing (SCS) for the associated UL SB may be constrained to be the same as that for the corresponding UL BWP. Alternatively, all the parameters in BWP configuration BWP-Uplink may be separately configured for the associated UL SB. Consequently, within the associated UL SB, UE performs UL transmission based on the parameters configured for the associated UL SB.

In one embodiment, the set of PRBs of the associated UL SB for a UL BWP may be directly configured. For example, it can be configured by a starting PRB index and the number of PRBs of the associated UL SB that are mapped to the Common Resource Block (CRB) grid, similar to locationAndBandwidth indication used for an UL/DL BWP configuration.

In one option, the associated UL SB for each UL BWP is configured separately. In this case, one UL SB may be associated with one UL BWP. In another option, an associated UL SB can be configured to associate with one or multiple UL BWPs.

In another embodiment, the set of PRBs of the associated UL SB for a DL BWP may be directly configured. For example, it can be configured by a starting PRB index and the number of PRBs of the associated UL SB that are mapped to the Common Resource Block (CRB) grid, similar to locationAndBandwidth indication used for UL/DL BWP configuration.

In one embodiment, a UE may be provided with a UL frequency resource region for a NOSB-FD symbol and the set of PRBs of the associated UL SB may be derived by the UL frequency resource region and the configured UL BWP. The UL frequency resource region for a NOSB-FD symbol may be provided to the UE using similar signaling structure as for DL/UL BWP configuration to indicate a starting PRB and a number of PRBs on the CRB grid. Further, the UL frequency resource region for a NOSB-FD symbol may be provided with respect to a configured or reference SCS value. As one example, the reference SCS value may be specified as 15 kHz for FR1 bands and 60 kHz for FR2 bands, or 60 kHz for FR2-1 bands and 120 kHz for FR 2-2 bands. In a further example, the configuration of the UL frequency resource region may be provided by either dedicated RRC signaling or common RRC signaling, i.e., using System Information Block (SIB) signaling in a cell-specific manner. In one option, an UL SB associated with a configured UL BWP may be determined as the intersection of the UL frequency resource region and the configured UL BWP. For example, UL SB A in FIG. 5 and UL SB D in FIG. 6 can be determined by this option. It is possible that the center of the associated UL SB is not aligned with the UL BWP. It may be up to UE to handle the mismatch.

In another option, an UL SB associated with a configured UL BWP may be determined as the maximum set of PRBs within the intersection of the UL frequency resource region and the configured UL BWP, subjected to same center frequency between the UL BWP and the associated UL SB. For example, UL SB B in FIG. 5 and UL SB E in FIG. 6 can be determined by this option.

In yet another option, an UL SB associated with a configured DL BWP may be determined as the intersection of the UL frequency resource region and the configured DL BWP. As a further example, an UL SB associated with a configured DL and UL BWP with same BWP indices may be determined as the intersection of the UL frequency resource region, the configured UL BWP, and the configured DL BWP.

In yet another option, for a pair of active DL and UL BWPs, an associated UL SB may be determined as the intersection of the UL frequency resource region and the active UL and/or DL BWP. In this case, UL SB is not determined for each configuration of DL/UL BWP, but determined for a given active UL and/or DL BWPs.

Note that, for the above options, if the SCS for the UL frequency resource region, DL BWP, or UL BWP are different, any intersection amongst these frequency regions may be defined with regard to a reference SCS that may be specified or configured by higher layers. As one example, the reference SCS value may be specified as 15 kHz for FR1 bands and 60 kHz for FR2 bands, or 60 kHz for FR2-1 bands and 120 kHz for FR 2-2 bands. Subsequently, according to the actual SCS for the UL SB, the exact PRBs may be determined similar to BWP determination on the CRB grid.

In one embodiment, the UL BWP and the associated UL SB may be activated or deactivated together, e.g., by the BWP indicator field in a DCI. If the UL BWP is activated, UE needs to know the use of the UL BWP or the associated UL SB in a UL transmission. The UL transmission may be a PUSCH or PUCCH transmission without repetition. The UL transmission may be a PUSCH or PUCCH repetition. In this case, the application of the UL BWP or the associated UL SB for the different PUSCH or PUCCH repetitions may be determined separately. The UL transmission may be the whole PUSCH or PUCCH transmission with repetitions. The UL transmission may include symbols of an SRS resource. The UL transmission may be the symbols of the SRS resources in a SRS resource set. The UL transmission may be a PRACH preamble.

Figure 7:
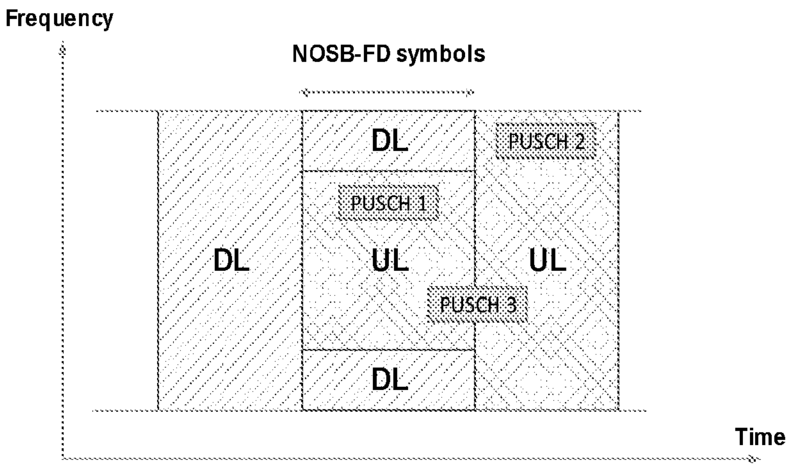
FIG. 7 illustrates a time domain resource allocation for PUSCHs, in accordance with some embodiments.

FIG. 7 illustrates one example on the different time domain resource allocation for 3 PUSCHs. PUSCH 1 is allocated only in the associated UL SB in NOSB-FD symbols. PUSCH 2 is allocated only in the UL BWP in regular symbols. On the other hand, PUSCH 3 is allocated across NOSB-FD symbols and regular symbols.

In one option, if the UL BWP is activated, the associated UL SB may be used if a time resource of a UL transmission is only allocated in NOSB-FD symbols, and the UL BWP is used if the time resource is only allocated in regular symbols. The UE may not expect that the UL transmission is allocated across NOSB-FD symbols and regular symbols. A switching time may be necessary for the switching between a UL transmission in the UL BWP and another transmission in the associated UL SB. In FIG. 7, PUSCH 3 is not valid time domain resource allocation.

In another option, if the UL BWP is activated, the associated UL SB may be used if a time resource of a UL transmission is at least allocated in NOSB-FD symbols, and the UL BWP is used if the time resource is only allocated in regular symbols. A switching time may be necessary for the switching between a UL transmission in the UL BWP and another transmission in the frequency region of the associated UL SB. If the associated UL SB is within the UL BWP, and if the UL transmission is at least allocated in NOSB-FD symbols, UE may expect the frequency resource of the UL transmission is allocated within the associated UL SB. The FDRA of the UL transmission may be defined in the set of PRBs of the associated UL SB. Alternatively, the FDRA can be still defined in the UL BWP, however, UE may not expect the FDRA indicates a PRB outside the associated UL SB. In FIG. 7, PUSCH 3 is a valid time domain resource allocation and PUSCH 3 can be allocated within the associated UL SB.

In another option, if the UL BWP is activated, the intersection of the UL BWP and the associated UL SB may be used if a time resource of a UL transmission is allocated across NOSB-FD symbols and regular symbols. Otherwise, the UL BWP or the associated UL SB may be used respectively if the time resource is allocated in regular symbols or NOSB-FD symbols. A switching time may be necessary for the switching between a UL transmission in the frequency region of the intersection and another transmission in the UL BWP or the associated UL SB. If the UL transmission is at least allocated in NOSB-FD symbols, UE may expect the frequency resource of the UL transmission is within the intersection of associated UL SB and the UL BWP. The FDRA of the UL transmission can be defined in the set of PRBs of the intersection. Alternatively, the FDRA can be still defined in the UL BWP or the associated UL SB, however, UE may not expect the FDRA indicates a PRB outside the intersection. In FIG. 7, PUSCH 3 is a valid time domain resource allocation and PUSCH 3 can be allocated within the intersection, i.e., the associated UL SB.

In another option, if the UL BWP is activated, the UL BWP or the associated UL SB may be used respectively if the first symbol of a time resource of a UL transmission is a regular symbol or a NOSB-FD symbol. A switching time may be necessary for the switching between a UL transmission in the UL BWP and another transmission in the frequency region of the associated UL SB.

In another option, if the UL BWP is activated, the UL BWP or the associated UL SB is used for a PUSCH or PUCCH transmission with repetitions may be determined respectively by the UL BWP or the associated UL SB used by the first PUSCH or PUCCH repetition.

In another option, if the UL BWP is activated, the application of the UL BWP or the associated UL SB may be indicated by a high layer configuration or dynamically indicated by a DCI. A switching time may be necessary for the switching between a UL transmission in the UL BWP and another transmission in the frequency region of the associated UL SB.

In one embodiment, the transmission (Tx) filters of UE may be defined separately for a UL transmission in the UL BWP or a UL transmission in the frequency region of the associated UL SB. For example, the filter for the associated UL SB just covers the PRBs of the associated UL SB, while the filter for UL BWP may need to cover all the PRBs of the UL BWP. By this way, the interference to adjacent PRBs that may be used for DL reception by other UEs can be reduced, if the associated UL SB is only a subset of the UL BWP. However, the application of a different filter in UL transmissions may subject to the UE capability. A switching time may be necessary if UE switches between a UL transmission in the UL BWP and a UL transmission in the frequency region of the associated UL SB.

In one option, if a UL transmission is allocated on both NOSB-FD symbols and regular symbols, the same Tx filter may be used for the whole UL transmission by the UE. In other words, the UE is not expected to change the Tx filer in the middle of the UL transmission. By this way, the switching time between NOSB-FD symbols and regular symbols is avoided within the UL transmission. The Tx filter for the associated UL SB may be applied to all symbols of the UL transmission. Alternatively, the Tx filter that applied to all symbols of the UL transmission can be the Tx filter for the UL BWP or the associated UL SB whichever with a smaller number of PRBs. With this option, it doesn't cause any increase of interference to other UEs. In FIG. 7, the Tx filter for the associated UL SB can be applied for PUSCH 1. The Tx filter for the UL BWP can be applied for PUSCH 2. As to PUSCH 3 which crosses NOSB-FD symbols and regular symbols, the Tx filter of the associated UL SB can be applied to all the symbols of PUSCH 3.

In one embodiment, the transmission (Tx) filters of UE may be defined separately in regular symbol or NOSB-FD symbol. For example, the filter for NOSB-FD symbols may just cover the PRBs of the associated UL SB, while the filter for regular symbols may cover all the PRBs of the UL BWP. By this way, the interference to adjacent PRBs that may be used for DL reception by other UEs can be reduced, if the associated UL SB is only a subset of the UL BWP. However, the application of a different filter in UL transmissions may subject to the UE capability.

In one option, a switching time may be expected for the switching between a UL transmission in the regular symbols and a UL transmission in the NOSB-FD symbols. Assuming symbol n is the first symbol after a switching from the regular symbols to the NOSB-FD symbols, or vice versa, the switching time can be located in one or more symbols before the start of symbol n, or located in one or more symbols after the end of symbol n−1, or located from symbol n−x to n+y, x,y=0, 1, . . . , x+y>0. The symbols which overlap with the switching time are not available for the UL transmission. UE may expect that the gap between two UL transmissions respectively using the regular symbols or the NOSB-FD symbols is not smaller than the switching time. Alternatively, if it happens there is not enough gap between two UL transmissions, the later UL transmission or the low priority UL transmission is dropped.

In one embodiment, the Tx filter determined for the UL BWP may apply to both the UL transmission in the UL BWP and that in the associated UL SB. By this way, there would not be a need for switching time when UE switches between transmission in the UL BWP and transmission in the associated UL SB.

In one embodiment, a switching time may be necessary if UE switches between a UL transmission in the UL BWP and a UL transmission in the frequency region of the associated UL SB. The symbols which overlap with the switching time are not available for the UL transmission.

In one option, for two UL transmissions respectively in the UL BWP or in the associated UL SB, the switching gap may be located right after the end of the earlier one of the two UL transmissions. In another option, for two UL transmissions respectively in the UL BWP or in the associated UL SB, the switching gap may be located right before the start of the later one of the two UL transmissions. In another option, for two UL transmissions respectively in the UL BWP or in the associated UL SB, it may be up to UE implementation to do the switching between the two UL transmissions. In another option, UE may not expect that the gap between two UL transmissions respectively in the UL BWP or in the associated UL SB is smaller than the necessary switching time.

Figure 8:
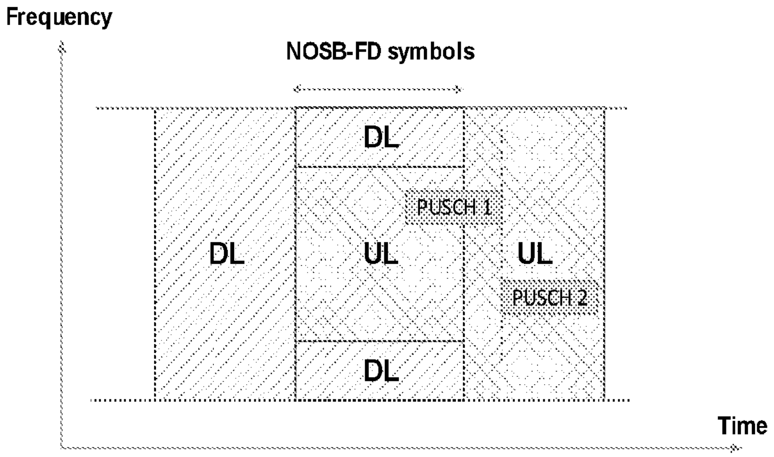
FIG. 8 illustrates two UL transmissions without enough switching time, in accordance with some embodiments.

FIG. 8 illustrates one example on two UL transmissions without enough switching time. PUSCH 1 is allocated across NOSB-FD symbols and regular symbols and is assumed to be transmitted in the associated UL SB. PUSCH 2 is transmitted in the UL BWP. Since there is no enough switching time, this is not valid scheduling.

In another option, if it happens there is not enough switching time between two UL transmissions respectively in the UL BWP or in the associated UL SB, the later UL transmission or the low priority UL transmission is dropped. For example, in FIG. 8, PUSCH 2 can be dropped.

In another option, if it happens there would not be enough switching time between two UL transmissions respectively in the UL BWP or in the associated UL SB, the UE may apply the same assumption for the two UL the transmissions. For example, if the earlier UL transmission is in the UL BWP or the associated UL SB, the later UL transmission can be assumed in the UL BWP or the associated UL SB too. In FIG. 8, PUSCH 2 may be transmitted assuming it is in the associated UL SB. This option may be only applicable if the earlier UL transmission is in the associated UL SB and the later UL transmission is in the UL BWP.

In one embodiment, the switching time between UL BWP and the associated UL SB may be smaller than existing BWP switching time in NR since the UL BWP and associated UL SB are associated with each other. For example, the switching time may be as small as the Tx-Rx or Rx-Tx switching time in NR TDD. Certain limitation may be applied, e.g., the center frequency must be same for the UL BWP and the associated UL SB, to achieve a fast switching. Unless the switching time can be smaller than the CP length, the symbols overlapped with the switching gap may not be available for the UL transmission. A PUSCH, PUCCH, or SRS overlapped with the switching gap can be dropped, punctured or rate matched. Alternatively, a slot with switching gap is not considered as an available slot for PUSCH, PUCCH or SRS transmission.

Alternatively, the associated UL SB may be treated as a different BWP from the UL BWP. As a result, a BWP switching time is needed to switch between a transmission in the UL BWP and a transmission in the associated UL SB. The value of the switching time can be same or comparable to the existing BWP switching time defined in NR.

Separate UL BWP for NOSB-FD Symbols

A secondary UL BWP can be configured in addition to a primary UL BWP that is configured within the carrier bandwidth. Here, a primary UL BWP corresponds to the UL BWP that is configured as part of regular BWP configuration by higher layers. The secondary UL BWP should be allocated within the UL frequency resource in NOSB-FD symbols. However, UE may not know the exact UL frequency resource region in NOSB-FD symbols.

In a typical case, the secondary UL BWP can be a subset of or equal to the primary UL BWP. Alternatively, a secondary UL BWP may be configured such that it includes the primary UL BWP.

As yet another alternative, a secondary UL BWP for a NOSB-FD symbol may be a subset of or equal to a DL BWP. According to this alternative, the secondary UL BWP configuration for a NOSB-FD symbol may be associated with a configured DL BWP (instead of configured UL BWP). Note that, for a DL and UL BWP pair with same BWP index, the secondary UL BWP can be seen as associated with both DL and UL BWPs.

As further alternatives, given a pair of active DL/UL BWPs, an secondary UL BWP for a NOSB-FD symbol may be a subset of or equal to the active DL BWP or active UL BWP.

The Tx filters of UE can be respectively determined for the primary and secondary UL BWPs. For a UE supporting multiple UL BWPs, only the primary UL BWPs are counted toward the number of configured UL BWPs of the UE, or both the primary and secondary UL BWPs are counted toward the number of configured UL BWPs of the UE. The primary and secondary UL BWPs must have aligned center frequency, which is also aligned with the center frequency of the configured DL BWP.

Figure 9:
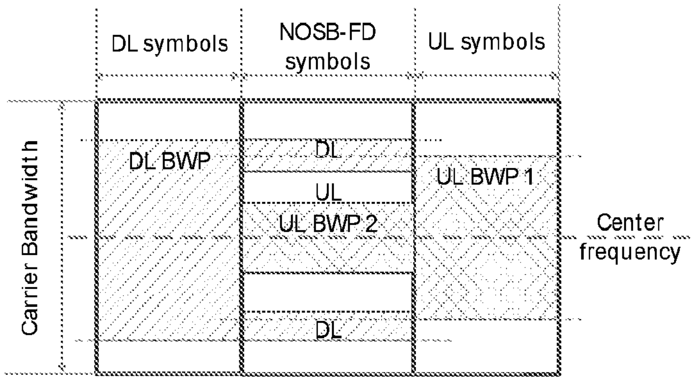
FIG. 9 illustrates a configuration of the primary and secondary UL BWPs, in accordance with some embodiments.

FIG. 9 illustrates one example of configuration of the primary and secondary UL BWPs. In FIG. 9, the secondary UL BWP is configured within the UL frequency resources in NOSB-FD symbols. the secondary UL BWP is within the primary UL BWP. The primary and secondary UL BWPs have the same center frequency as the DL BWP.

In one embodiment, the secondary UL BWP may be configured with a same BWP index as the primary UL BWP and may be used for UL transmissions involving one or more NOSB-FD symbols. Therefore, the secondary UL BWP is associated with the primary UL BWP. The primary and secondary UL BWP can be activated or deactivated together, e.g., by the BWP indicator field in a DCI. If the BWP index is activated, UE needs to know the use of the primary or secondary UL BWP in a UL transmission.

In one option, if the BWP index is activated, the secondary UL BWP may be used if a time resource of a UL transmission is only allocated in NOSB-FD symbols, and the primary UL BWP is used if the time resource is only allocated in regular symbols. The UE may not expect that a time resource is allocated across NOSB-FD symbols and regular symbols.

In another option, if the BWP index is activated, the secondary UL BWP may be used if a time resource of a UL transmission is at least allocated in NOSB-FD symbols, and the primary UL BWP is used if a time resource is only allocated in regular symbols.

In another option, if the BWP index is activated, the intersection of the primary and secondary UL BWPs may be used if a time resource of a UL transmission is allocated across NOSB-FD symbols and regular symbols. Otherwise, the primary or secondary UL BWP may be respectively used if the time resource is allocated in regular symbols or NOSB-FD symbols.

In another option, if the BWP index is activated, the primary or secondary UL BWP may be respectively used if the first symbol of a time resource of a UL transmission is a regular symbol or a NOSB-FD symbol.

In another option, if the BWP index is activated, the primary or secondary UL BWP is used for a PUSCH or PUCCH transmission with repetitions may be determined respectively by the primary or secondary UL BWP used by the first PUSCH or PUCCH repetition.

In another option, if the BWP index is activated, the application of the primary or secondary UL BWP may be indicated by a high layer configuration or dynamically indicated by a DCI.

In one embodiment, the secondary UL BWP may be configured with a different BWP index from the primary UL BWP. Therefore, the primary UL BWP and the secondary UL BWP cannot be activated at the same time. The activation of the first or the secondary UL BWP can be determined by the BWP indicator field in a DCI or by the BWP inactivity timer expiration. For the latter case, UE may switch back to the primary UL BWP or the default UL BWP.

In one embodiment, all the parameters in BWP configuration BWP-Uplink may need to be separately configured for the second BWP. Consequently, within the secondary UL BWP, UE performs UL transmission based on the parameters configured for the secondary UL BWP. Alternatively, the secondary UL BWP may be treated as a 'light BWP', some parameters can be separately configured for the secondary UL BWP, for example, the parameter locationAndBandwidth, while other parameters may reuse the configuration for the primary UL BWP.

In one embodiment, the secondary UL BWP may be treated as a different BWP from the primary UL BWP. As a result, a BWP switching time is needed to switch between the primary and secondary UL BWP. The value of the switching time can be same or comparable to the existing BWP switching time defined in NR. Alternatively, the BWP switching time between the primary and secondary UL BWP may be smaller than existing BWP switching time in NR since the primary and secondary UL BWPs are associated with each other. Certain limitation may be applied, e.g., the center frequency must be same for the primary and secondary UL BWP, to achieve a fast BWP switching.

DL Resource Handling in NOSB-FD Symbols and Regular Symbols

In one embodiment, a DL BWP can be configured within the carrier bandwidth and one or more associated DL SB(s) can be further configured or derived. The associated DL SB(s), that may not all be contiguous in frequency between different DL SBs, should be allocated within the DL frequency resource region in NOSB-FD symbols. However, UE may not know the exact DL frequency resource region in NOSB-FD symbols.

In a typical case, the associated DL SB(s) can be a subset of or equal to the DL BWP. Alternatively, one or more DL SB(s) may be configured such that the overall span across the DL SB(s), including any gaps in between, includes the configured DL BWP. For a UE supporting multiple DL BWPs, the different DL BWPs of a UE may be associated with same or different DL SBs. If a DL BWP is activated for the UE, the associated DL SB also become applicable based on the configuration or scheduling. The DL BWP and the associated DL SB(s) may have the aligned center frequency, which is also aligned with the center frequency of the UL BWP. On the other hand, it may be allowed that the center frequency of associated DL SB(s) can be different from the DL BWP, if only the associated DL SB(s) is a subset of or equal to the DL BWP. Then, it may be up to UE implementation to handle the mismatch. The filter for the associated DL SB(s) may be different from that of the DL BWP to reduce interference. However, the application of a different filters may be subject to the UE capability. Alternatively, the filter for the DL BWP may be applied to the associated DL SB(s).

In one option, the set of PRBs of the associated DL SB(s) for a DL BWP can be directly configured.

In another option, a DL frequency resource region in NOSB-FD symbols may be configured and the set of PRBs of the associated DL SB(s) can be derived by the DL frequency resource region and the configured DL BWP. For example, the associated DL SB(s) can be determined as the intersection of the DL frequency resource region and the configured DL BWP. For example, DL SB 1 & 2 in FIG. 10 are the intersection of the DL frequency resource and the configured DL BWP.

Figure 10:
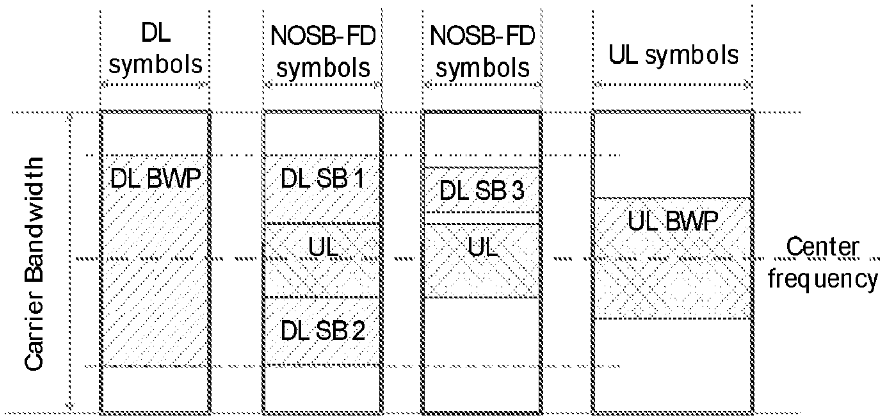
FIG. 10 illustrates configuration of DL BWP and the associated DL SBs, in accordance with some embodiments.

FIG. 10 illustrates one example of configuration of the DL BWP and two possible configurations of associated DL SBs. In FIG. 10, the multiple associated DL SBs are configured within the DL BWP. DL SB 1&2 include whole DL frequency resource in NOSB-FD symbols within the DL BWP. On the other hand, for DL SB 3, it is just configured on a subset of DL frequency resource in NOSB-FD symbols within the DL BWP. The center frequency for DL SB 3 is not aligned with the DL BWP. However, it may be a UE capability to handle such mismatch.

In one embodiment, a secondary DL BWP may be configured in addition to a primary DL BWP that is configured within the carrier bandwidth. The secondary DL BWP may be overlapped with the UL frequency resource in NOSB-FD symbols. It may be up to gNB scheduling to avoid DL transmission in the secondary DL BWP in the UL frequency resource in NOSB-FD symbols. Note that, in contrast to a primary (regular) DL BWP configuration, a secondary DL BWP may be configured to comprise of multiple frequency regions that may not all be contiguous in frequency. Such a configuration may be signaled to a UE using multiple configurations of starting PRBs and number of contiguous-in-frequency PRBs. Alternatively, a Resource Block Group (RBG)-based signaling scheme (similar to Type 1 FDRA for PDSCH/PUSCH scheduling) may be used to configure a secondary DL BWP.

In a typical case, the secondary DL BWP can be a subset of or equal to the primary DL BWP. Alternatively, a secondary DL BWP for a NOSB-FD symbol may be configured such that the overall span of the secondary DL BWP, including any gaps in between, includes the configured DL BWP. The Rx filters of UE can be respectively determined from the primary and secondary DL BWPs. The primary and secondary DL BWPs must have aligned center frequency, which is also aligned with the center frequency of the configured UL BWP.

Figure 11:
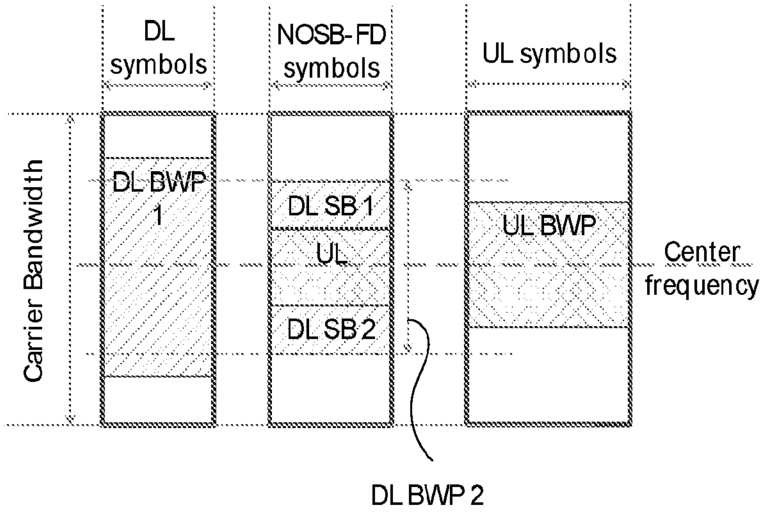
FIG. 11 illustrates a configuration of the primary and secondary DL BWPs, in accordance with some embodiments.

FIG. 11 illustrates one example of configuration of the primary and secondary DL BWPs. In FIG. 11, the secondary DL BWP is configured within the primary DL BWP. Note: the scheduled DL PRBs in FIG. 11 are separated into two regions, i.e., DL SB 1 and DL SB 2 in the DL BWP 2. The primary and secondary DL BWPs have the same center frequency as the UL BWP.

In another embodiment, one or more DL SB(s) may be determined as either one of the following:

- Frequency resources within configured DL BWP but not included in UL frequency resource region;
- Frequency resources within configured DL BWP but not included in UL SB;
- Frequency resources within active DL BWP but not included in UL frequency resource region;
- Frequency resources within active DL BWP but not included in UL SB.

In another embodiment, a secondary DL BWP may be determined as either one of the following:

- Frequency resources within configured DL BWP but not included in UL frequency resource region;
- Frequency resources within configured DL BWP but not included in UL SB;
- Frequency resources within active DL BWP but not included in UL frequency resource region;
- Frequency resources within active DL BWP but not included in UL SB.

In another embodiment, a pair of DL BWP and UL BWP can be configured within the carrier bandwidth and the associated DL/UL SBs can be further configured or derived. UE may expect that the configured or derived associated DL SB(s) and UL SB do not overlap.

In another embodiment, for scheduling of PDSCH in NOSB-FD symbols, the Virtual Resource Blocks (VRBs) assigned for reception are those that may not be used for mapping of UL SBs. Alternatively, the Virtual Resource Blocks (VRBs) assigned for reception of the PDSCH are those that may not be used for mapping of UL frequency resource region. This alternative may be limited to the case wherein the DL BWP includes the UL frequency resource region.

In a further option, for scheduling of PDSCH in NOSB-FD symbols, a UE may not expect to be provided with interleaved Virtual Resource Block-to-Physical Resource Block (VRB-to-PRB) mapping for a scheduled PDSCH for all PDSCH that is not scheduled by DCI format 1_0 in a PDCCH common search space (CSS).

Alternatively, for scheduling of PDSCH in NOSB-FD symbols with interleaved VRB-to-PRB mapping, a UE may assume that the DL BWP size used to determine the (VRB-to-PRB) mapping for a scheduled PDSCH corresponds to the aggregate size of all DL SB(s), i.e., includes the PRBs of the DL BWP that do not overlap with UL SBs or UL frequency resource region.

In another embodiment, a UE configured with NOSB-FD operation may not expect to be scheduled with a PDSCH by DCI format 1_0 in a PDCCH CSS such that either the PDCCH with the DCI format 1_0 or the scheduled PDSCH overlap in time with a NOSB-FD symbol if any PRBs of CORESET #0 overlaps with an UL SB in NOSB-FD symbol.

In another embodiment, a UE may not expect to be configured with UL SB or DL SB(s) corresponding to initial DL or initial UL BWPs. In another variant of the embodiment, a UE may be configured to operate with NOSB-FD operation associated only with RRC-configured DL or UL BWPs.

Some embodiments are directed to a user equipment (UE) configured for operation in a fifth-generation new radio (5G NR) network. Some embodiments are directed to a user equipment (UE) configured for operation in a sixth generation (6G) network. In these embodiments, the UE may be configured to decode resource configuration information received from a generation Node B (gNB) for Non-Overlapping Sub-Band Full Duplex (NOSB-FD) communication. Accordingly, the UE may communicate with the gNB in accordance with the resource configuration information. In these embodiments, the resource configuration information for the NOSB-FD communication indicates downlink symbols within a carrier bandwidth for downlink communication, uplink symbols within the carrier bandwidth for uplink communication, and NOSB-FD symbols within the carrier bandwidth. In these embodiments, each NOSB-FD symbol is configurable for both uplink and downlink communication. In these embodiments, for any one of the NOSB-FD symbols, one or more uplink subbands within the carrier bandwidth may be configurable to be allocated for uplink communication and one or more downlink subbands of the carrier bandwidth may be configurable to be allocated for downlink communication.

In these embodiments, the resource configuration information is determined from a mapping of physical resource blocks (PRBs) to a common resource block (CRB) grid. The UE may store the resource configuration information in memory. In these embodiments, the UE may be able to either transmit or receive, but not both, during a NOSB-FD symbol even though the gNB is able to transmit and receive during a NOSB-FD symbol.

In some embodiments, a downlink bandwidth part (DL BWP) may be configured within the carrier bandwidth for the downlink symbols and the NOSB-FD symbols. In these embodiments, an uplink bandwidth part (UL BWP) may be configured within the carrier bandwidth in the uplink symbols and the NOSB-FD symbols. In these embodiments, both the UL and DL BWPs are configured to be within the NOSB-FD symbols.

In some embodiments, the one or more uplink subbands for the NOSB-FD symbols may be configured within the UL BWP and each of the one or more uplink subbands may comprise a subset of the UL BWP. In these embodiments, the one or more downlink subbands for each of the NOSB-FD symbols may be configured with the DL BWP and each of the one or more downlink subbands may comprise a subset of the DL BWP. An example of this is illustrated in FIG. 5.

In some embodiments, the resource configuration information for the NOSB-FD communication further indicates flexible symbols with the carrier bandwidth. In these embodiments, the flexible symbols may be configured for either uplink or downlink communication.

In some embodiments, a number of the one or more downlink subbands for each of the NOSB-FD symbols may be up to two subbands. In these embodiments, when the number of the downlink subbands for each of the NOSB-FD symbols is two subbands and a number of the uplink subbands for each of the NOSB-FD symbols is one, the one uplink subband may be provided in between the two downlink subbands, although the scope of the embodiments is not limited in this respect.

In some embodiments, the resource configuration information for the uplink subband for each of the NOSB-FD symbols for the UL BWP may be configured to the UE from the gNB based on a mapping to the CRB grid. In these embodiments, resources for the uplink subband for each of the NOSB-FD symbols for the UL BWP may comprise a set of PRBs. In these embodiments, the UE may be configured to determine a number of PRBs for an associated one of the uplink subbands based on a starting PRB index based on the mapping. Accordingly, each uplink subband for an NOSB-FD symbol may utilize different PRBs, as illustrated in FIG. 6.

In some embodiments, to determine resources for the NOSB-FD communication, the UE may also be configured to determine an uplink frequency resource region for one or more of the NOSB-FD symbols based on a starting PRB index and a number of PRBs on the CRB grid. The UE may also derive a set of PRBs for the one or more uplink subbands based on an uplink frequency resource region and the configured UL BWP. In some embodiments, the UE may be configured to derive the set of PRBs for the one or more uplink subbands based on the uplink frequency resource region and the configured UL BWP based on an intersection of the uplink frequency resource region and the configured UL BWP, although the scope of the embodiments is not limited in this respect.

In some embodiments, the UE may be configured to apply a first transmit (TX) filter for a first uplink transmission during uplink symbols of an UL BWP and apply a second TX filter for a second uplink transmission during a NOSB-FD symbol within an UL subband of the UL BWP. In these embodiments, the first TX filter may be configured for a first set of PRBs associated with a bandwidth of the UL BWP and the second TX filter may be configured for a subset of the first set of PRBs, the subset associated with the UL subband. In these embodiments, for a single uplink transmission allocated on both an NOSB-FD symbol and an UL symbol, the UE may be configured to apply the first TX filter for the uplink transmission during both the uplink symbol and the NOSB-FD symbol.

In some of these embodiments, if a uplink transmission is allocated on both NOSB-FD symbols and regular symbols, the same Tx filter may be used for the whole uplink transmission by the UE. In other words, the UE may not be expected to change the Tx filer in the middle of the uplink transmission.

In some embodiments, the UE is further configured to decode a downlink control information (DCI) format that schedules a physical downlink shared channel (PDSCH) in one of the NOSB-FD symbols. In these embodiments, virtual resource blocks (VRBs) assigned for reception of the PDSCH do not include VRBs in the one or more uplink subbands of the NOSB-FD symbol.

In some embodiments, the UE may also be configured to interpret a symbol that is indicated to be a NOSB-FD symbol as a downlink symbol if the symbol overlaps with certain cell specific downlink signals (e.g., a SS/PBCH block) and the certain cell specific downlink signals are received from the gNB in the symbol.

In some embodiments, when the UE is configured by higher-layer signalling for a UE-specific downlink reception during a NOSB-FD symbol and when the UE is dynamically scheduled for an uplink transmission during the NOSB-FD symbol, the UE may be configured to drop the UE-specific downlink reception and transmit the dynamically scheduled uplink transmission during the NOSB-FD symbol. In some embodiments, when the UE is configured by higher-layer signalling for a UE-specific uplink transmission during a NOSB-FD symbol and when the UE is dynamically scheduled for a downlink reception during the NOSB-FD symbol, the UE may be configured to drop the UE-specific uplink transmission and receive the dynamically scheduled downlink reception during the NOSB-FD symbol.

In these embodiments, a dynamically scheduled uplink transmission may have a higher priority than a UE-specific downlink reception configured by higher layers. In these embodiments, a dynamically scheduled downlink reception may have a higher priority than a UE-specific uplink transmission configured by higher layers.

In some embodiments, when the UE is configured by higher layer signalling for a cell-specific uplink transmission during a NOSB-FD symbol, and when the UE is configured with a cell-specific or dynamically scheduled downlink reception during the NOSB-FD symbol, the UE may be configured to determine whether to drop the uplink transmission or the downlink reception.

In some embodiments, when the UE is configured with or dynamically scheduled for a UE-specific uplink transmission during a NOSB-FD symbol and the UE may be configured with a cell-specific SS/PBCH reception during the NOSB-FD symbol, the UE may be configured to refrain from transmitting the UE-specific uplink transmission during the NOSB-FD symbol.

In some embodiments, when the UE is configured for a UE-specific uplink transmission and a UE-specific downlink reception during one of the NOSB-FD symbols, the UE may be configured to determine whether to transmit the UE-specific uplink transmission or to receive the UE-specific reception during the NOSB-FD symbol based on a priority of the UE-specific uplink transmission and a priority of the UE-specific downlink reception. In these embodiments, the priorities may be configured by higher layer signalling.

In some embodiments, when the UE-specific uplink transmission and the UE-specific downlink reception are associated with a same priority or when either the UE-specific uplink transmission or the UE-specific downlink reception is not associated a priority, the UE may be configured to determine whether to whether to transmit the UE-specific uplink transmission or to receive the UE-specific reception during the NOSB-FD symbol based on criterion including whether the UE-specific reception is a PDCCH reception, whether the PDCCH reception is within a predetermined search-space set, and whether the PDCCH reception is associated with a predetermined DCI format. In these embodiments, it may be up to the UE to determine whether to transmit the UE-specific uplink transmission or to receive the UE-specific reception during the NOSB-FD symbol.

In some embodiments, when the UE is configured for an uplink transmission in an uplink subband during a first of the NOSB-FD symbols and is configured for a downlink reception in a downlink subband during a second of the NOSB-FD symbols, the UE may drop either the uplink transmission or the downlink reception when there is an insufficient gap between the first and the second NOSB-FD symbols.

Some embodiments are directed to a non-transitory computer-readable storage medium that stores instructions for execution by processing circuitry a user equipment (UE) configured for operation in a fifth-generation new radio (5G NR) network or a sixth generation (6G) network. In these embodiments, the processing circuitry may be configured to decode resource configuration information received from a generation node B (gNB) for Non-Overlapping Sub-Band Full Duplex (NOSB-FD) communication and configure the UE to communicate with the gNB in accordance with the resource configuration information.

Some embodiments are directed to a generation node B (gNB) configured for operation in a fifth-generation new radio (5G NR) network or a sixth generation (6G) network. In these embodiments, the gNB may encode resource configuration information for transmission to a UE to configure the UE for Non-Overlapping Sub-Band Full Duplex (NOSB-FD) communication with the gNB. In these embodiments, the resource configuration information for the NOSB-FD communication indicates downlink symbols within a carrier bandwidth for downlink communication, uplink symbols within the carrier bandwidth for uplink communication, and NOSB-FD symbols within the carrier bandwidth configurable. Each NOSB-FD symbol may be configurable for both uplink and downlink communication. In these embodiments, for any one of the NOSB-FD symbols, one or more uplink subbands within the carrier bandwidth may be configurable to be allocated for uplink communication and one or more downlink subbands of the carrier bandwidth may be configurable to be allocated for downlink communication.

In these embodiments, the gNB may decode uplink transmissions from the UE within the uplink symbols, encode downlink transmission for transmission to the UE within the downlink symbols, and either decode uplink transmissions from the UE or encode a downlink transmission to the UE within any one of the NOSB-FD symbols. In these embodiments, the resource configuration information may be encoded in one of radio-resource control (RRC) signalling, a downlink control information (DCI) format and a system information block (SIB).

Figure 12:
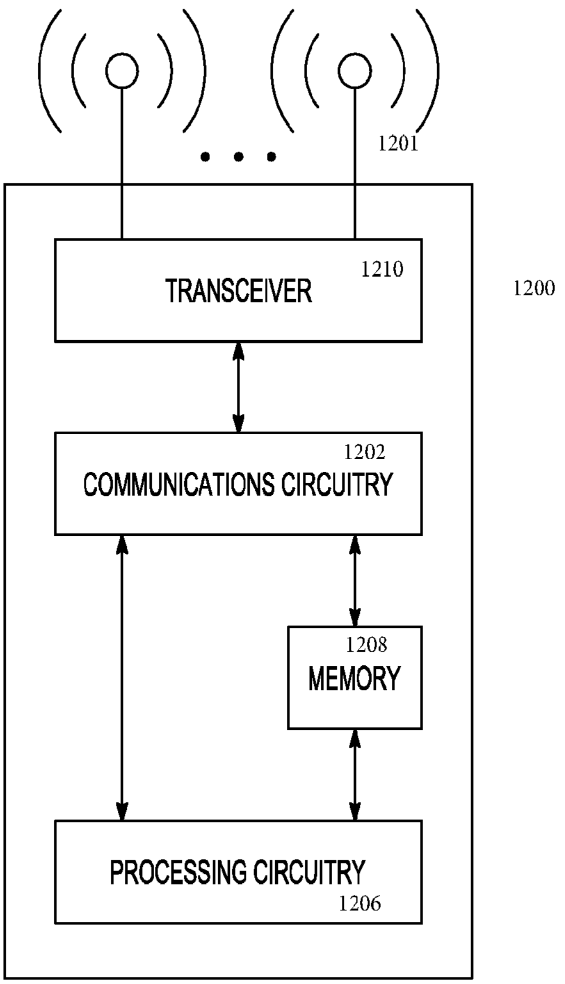
FIG. 12 illustrates a functional block diagram of a wireless communication device, in accordance with some embodiments.

FIG. 12 illustrates a functional block diagram of a wireless communication device, in accordance with some embodiments. Wireless communication device 1200 may be suitable for use as a UE or gNB configured for operation in a 5G NR or 6G network.

The communication device 1200 may include communications circuitry 1202 and a transceiver 1210 for transmitting and receiving signals to and from other communication devices using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication device 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication device 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 1200 may include one or more of a keyboard, a display, a non-volatile memory port, multiple antennas, a graphics processor, an application processor, speakers, and other mobile device elements. The display may be an LCD screen including a touch screen.

Although the communication device 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1200 may refer to one or more processes operating on one or more processing elements.

EXAMPLES (SET 1)

1. A system and methods of DL reception and UL transmission in full duplex system comprising:
   configuring, by a gNB, UL and DL resource within the serving cell or BWP bandwidth for different symbols.
   receiving, by a UE, the UL and DL resource configuration,
   receiving, by a UE, the UL/DL signals configuration, and/or the DCI scheduling the UL/DL signals, determining, by a UE, transmit UL or receive DL.
2. Method of example 1, where the UL and DL resource configuration includes full UL in a symbol, full DL in a symbol, and UL and DL sub-band within the same symbol.

Method of example 2, where the UL and DL resource configuration configures UL and DL sub-band within the same symbol, UE may expect non-overlapped sub-band based full duplex (NOSB-FD) operation in the symbol.

3. Method of example 1, where UE determine to transmit UL or receive DL according to cell-specific configured DL/UL signal, UE-specific configured DL/UL signal, the DCI scheduling UL/DL in the different sub-band within the same symbol.

Method of example 3 and example 4, in a symbol with potential NOSB-FD operation, if the UE is configured with UE-specific UL transmission and the UE is dynamically scheduled for a DL reception, the UE drops the configured UE-specific UL transmission and receives scheduled DL.

4. Method of example 3 and example 4, in a symbol with potential NOSB-FD operation, if the UE is configured with UE-specific DL reception and the UE is dynamically scheduled for a UL transmission, the UE drops the configured UE-specific DL reception and transmits scheduled UL.

Methods of example 3 and example 4, in a symbol with potential NOSB-FD operation, if the UE is configured with UE-specific UL transmission for RRC inactive or RRC idle state and cell-specific DL reception, the UE drops the DL reception and transmits the UL.

5. Methods of example 3 and example 4, in a symbol with potential NOSB-FD operation, if the UE is configured with cell-specific UL transmission and the UE is dynamically scheduled with DL reception, the UE receives the DL and does not transmit PRACH/MsgA PUSCH or CG-PUSCH for SDT operation in the RO/PO, or UE transmits PRACH/MsgA PUSCH or CG-PUSCH for SDT operation in the RO/PO and UE does not receive the DL.

Methods of example 3 and example 4, in a symbol with potential NOSB-FD operation, if the UE is configured with UE-specific DL reception and cell-specific UL transmission, UE transmits PRACH/Msg1 PUSCH/MsgA PUSCH or CG-PUSCH for SDT operation in valid RO/PO and does not receive the DL, or UE transmits or receive according to gNB configuration.

6. Methods of example 3 and example 4, in a symbol with potential NOSB-FD operation, if the UE is configured with cell-specific DL reception for PDCCH in Type 0/0A/1/2 CSS while the UE is dynamically scheduled for an UL transmission, the UE drops the configured DL reception and transmits the scheduled UL.

Methods of example 3 and example 4, in a symbol with potential NOSB-FD operation, if the UE is configured with cell-specific DL reception for PDCCH in Type 0/0A/1/2 CSS while the UE is dynamically scheduled for an UL transmission, the UE drops the configured DL reception and transmits the scheduled UL.

7. Methods of example 3 and example 4, in a symbol with potential NOSB-FD operation, if the UE is configured with UE-specific UL transmission and cell-specific SS/PBCH reception, and UE does not transmit the UL.
8. Methods of example 3 and example 4, in a symbol with potential NOSB-FD operation, if the UE is configured with UE-specific UL transmission and UE-specific DL reception, UE transmits or receives with higher priority, or UE receives DL if the DL reception is PDCCH reception.

EXAMPLES (SET 2)

1. A system and methods of DL reception and UL transmission in full duplex system comprising:
   configuring, by a gNB, UL and DL bandwidth part (BWPs) configurations for different symbols.
   receiving, by a UE, the UL and DL resource configuration,
   receiving, by a UE, the UL/DL signals configuration, and/or the DCI scheduling the UL/DL signals,
   determining, by a UE, transmit UL or receive DL.

2. Method of example 1, a UL BWP is configured within the carrier bandwidth and an associated UL subband (UL SB) is further configured or derived.
3. Method of example 2, the associated UL SB is a subset of or equal to the UL BWP or the DL BWP.
4. Method of example 2, a UE is provided with a UL frequency resource region for a NOSB-FD symbol and the set of PRBs of the associated UL SB is derived by the UL frequency resource region and the configured UL BWP.
5. Method of example 4, an UL SB associated with a configured UL BWP is determined as the intersection of the UL frequency resource region and the configured UL BWP or DL BWP.
6. Method of example 4, an UL SB associated with a configured UL BWP is determined as the maximum set of PRBs within the intersection of the UL frequency resource region and the configured UL BWP or DL BWP, subjected to same center frequency
7. Method of example 5 or 6, one of the following options is used to derive the associated UL SB:
   - the associated UL SB is used if a time resource of a UL transmission is only allocated in NOSB-FD symbols, and the UL BWP is used if the time resource is only allocated in regular symbols; or
   - the associated UL SB is used if a time resource of a UL transmission is at least allocated in NOSB-FD symbols, and the UL BWP is used if the time resource is only allocated in regular symbols; or
   - UL BWP or the associated UL SB is used respectively if the first symbol of a time resource of a UL transmission is a regular symbol or a NOSB-FD symbol; or
   - the UL BWP or the associated UL SB is used for a PUSCH or PUCCH transmission with repetitions is determined respectively by the UL BWP or the associated UL SB used by the first PUSCH or PUCCH repetition; or
   - the application of the UL BWP or the associated UL SB is indicated by a high layer configuration or dynamically indicated by a DCI.
8. Method of example 2, the transmission (Tx) filters of UE is defined separately for a UL transmission in the UL BWP or a UL transmission in the frequency region of the associated UL SB
9. Method of example 8, if a UL transmission is allocated on both NOSB-FD symbols and regular symbols, the same Tx filter is used for the whole UL transmission by the UE
10. Method of example 2, the Tx filter determined for the UL BWP applies to both the UL transmission in the UL BWP and that in the associated UL SB.
11. Method of example 1, A secondary UL BWP is configured in addition to a primary UL BWP that is configured within the carrier bandwidth.
12. Method of example 11, the secondary UL BWP is a subset of or equal to the primary UL BWP
13. Method of example 11, the secondary UL BWP is configured with a same BWP index as the primary UL BWP
14. Method of example 13, one of the following options is used to derive the associated UL SB:
   - the secondary UL BWP is used if a time resource of a UL transmission is only allocated in NOSB-FD symbols, and the primary UL BWP is used if the time resource is only allocated in regular symbols; or
   - the secondary UL BWP is used if a time resource of a UL transmission is at least allocated in NOSB-FD symbols, and the primary UL BWP is used if a time resource is only allocated in regular symbols; or
   - the primary or secondary UL BWP is respectively used if the first symbol of a time resource of a UL transmission is a regular symbol or a NOSB-FD symbol; or
   - the primary or secondary UL BWP is used for a PUSCH or PUCCH transmission with repetitions is determined respectively by the primary or secondary UL BWP used by the first PUSCH or PUCCH repetition; or
   - the application of the primary or secondary UL BWP is indicated by a high layer configuration or dynamically indicated by a DCI.
15. Method of example 1, a DL BWP is configured within the carrier bandwidth and one or more associated DL SB(s) are further configured or derived.
16. Method of example 15, the associated DL SB(s) are a subset of or equal to the DL BWP
17. Method of example 15, a DL frequency resource region in NOSB-FD symbols is configured and the set of PRBs of the associated DL SB(s) is derived by the DL frequency resource region and the configured DL BWP.
18. Method of example 1, a secondary DL BWP is configured in addition to a primary DL BWP that is configured within the carrier bandwidth.
19. Method of example 18, the secondary DL BWP is a subset of or equal to the primary DL BWP
20. Method of example 1, a pair of DL BWP and UL BWP are configured within the carrier bandwidth and the associated DL/UL SBs is further configured or derived.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) configured for operation in a fifth-generation new radio (5G NR) network, the UE comprising: processing circuitry; and memory, wherein the processing circuitry is configured to:
   - decode signalling from the network comprising resource configuration information configuring the UE with sub-band non-overlapping full duplex (SBFD) symbols;
   - when physical downlink shared channel (PDSCH) receptions are scheduled across the SBFD symbols and non-SBFD symbols in different slots, receive a PDSCH in the SBFD symbols and in the non-SBFD symbols in the different slots, after applying collision handling, when the resource configuration information indicates that the PDSCH can be received in both the SBFD symbols and the non-SBFD symbols in a given bandwidth part (BWP);
   - when the PDSCH receptions are scheduled across the SBFD symbols and the non-SBFD symbols in the different slots, determine whether to receive the PDSCH in either the SBFD symbols or the non-SBFD symbols based on a symbol type of a first PDSCH reception occasion, when the resource configuration information does not indicate that the PDSCH can be received in both the SBFD symbols and the non-SBFD symbols in the given BWP; and wherein when the UE is configured with the SBFD symbols, the processing circuitry is to configure the UE to refrain from receiving a PDSCH that is scheduled across the SBFD symbols and the non-SBFD symbols within a same slot.

2. The UE of claim 1, when the PDSCH receptions are scheduled across the SBFD symbols and the non-SBFD symbols in the different slots and when the resource configuration information does not indicate that the PDSCH can be received in both the SBFD symbols and the non-SBFD symbols in the given BWP:

the UE determines that the PDSCH is to be received in the non-SBFD symbols when a symbol type associated with the first PDSCH reception occasion is a non-SBFD symbol, and the UE determines that the PDSCH is to be received in the SBFD symbols when a symbol type associated with the first PDSCH reception occasion is an SBFD symbol.

3. The UE of claim 2, wherein the first PDSCH reception occasion is either indicated by a scheduling DCI or is associated with an activation DCI.

4. The UE of claim 1, wherein the SBFD symbols are configurable to include at least one uplink subband and at least one downlink subband within a carrier bandwidth.

5. The UE of claim 4, wherein the UE configured to receive in downlink subbands of the SBFD symbols that are within an active DL BWP, and wherein the UE configured to transmit in uplink subbands of the SBFD symbols that are within an active UL BWP.

6. The UE of claim 5, wherein slots comprise one or more of downlink symbols, uplink symbols, and flexible symbols, and wherein a downlink or flexible symbol comprises an SBFD symbol when configured with an uplink subband and one or more downlink subbands.

7. The UE of claim 6, wherein for reception of the PDSCH in the SBFD symbols and in the non-SBFD symbols in the different slots, application of the collision handling comprises the processing circuitry configuring the UE to:

determine whether a symbol in any of the different slots is an uplink symbol; and refrain from receiving the PDSCH in any of the different slots that has at least one uplink symbol.

8. A non-transitory computer-readable storage medium that stores instructions for execution by processing circuitry of a user equipment (UE) configured for operation in a fifth-generation new radio (5G NR) network, the processing circuitry configured to:

decode signalling from the network comprising resource configuration information configuring the UE with subband non-overlapping full duplex (SBFD) symbols;

when physical downlink shared channel (PDSCH) receptions are scheduled across the SBFD symbols and non-SBFD symbols in different slots, receive a PDSCH in the SBFD symbols and in the non-SBFD symbols in the different slots, after applying collision handling, when the resource configuration information indicates that the PDSCH can be received in both the SBFD symbols and the non-SBFD symbols in a given bandwidth part (BWP);

when the PDSCH receptions are scheduled across the SBFD symbols and the non-SBFD symbols in the different slots, determine whether to receive the PDSCH in either the SBFD symbols or the non-SBFD symbols based on a symbol type of a first PDSCH reception occasion, when the resource configuration information does not indicate that the PDSCH can be received in both the SBFD symbols and the non-SBFD symbols in the given BWP; and wherein when the UE is configured with the SBFD symbols, the processing circuitry is to configure the UE to refrain from receiving a PDSCH that is scheduled across the SBFD symbols and the non-SBFD symbols within a same slot.

9. The non-transitory computer-readable storage medium of claim 8, when the PDSCH receptions are scheduled across the SBFD symbols and the non-SBFD symbols in the different slots and when the resource configuration information does not indicate that the PDSCH can be received in both the SBFD symbols and the non-SBFD symbols in the given BWP:

the UE determines that the PDSCH is to be received in the non-SBFD symbols when a symbol type associated with the first PDSCH reception occasion is a non-SBFD symbol, and the UE determines that the PDSCH is to be received in the SBFD symbols when a symbol type associated with the first PDSCH reception occasion is an SBFD symbol.

10. The non-transitory computer-readable storage medium of claim 9, wherein the first PDSCH reception occasion is either indicated by a scheduling DCI or is associated with an activation DCI.

11. The non-transitory computer-readable storage medium of claim 2, wherein the SBFD symbols are configurable to include at least one uplink subband and at least one downlink subband within a carrier bandwidth.

12. The non-transitory computer-readable storage medium of claim 11, wherein the UE configured to receive in downlink subbands of the SBFD symbols that are within an active DL BWP, and wherein the UE configured to transmit in uplink subbands of the SBFD symbols that are within an active UL BWP.

13. The non-transitory computer-readable storage medium of claim 12, wherein slots comprise one or more of downlink symbols, uplink symbols, and flexible symbols, and wherein a downlink or flexible symbol comprises an SBFD symbol when configured with an uplink subband and one or more downlink subbands.

14. The non-transitory computer-readable storage medium of claim 13, wherein for reception of the PDSCH in the SBFD symbols and in the non-SBFD symbols in the different slots, application of the collision handling comprises the processing circuitry configuring the UE to:

determine whether a symbol in any of the different slots is an uplink symbol; and refrain from receiving the PDSCH in any of the different slots that has at least one uplink symbol.

* * * * *